(12) United States Patent
Horn

(10) Patent No.: US 10,850,661 B2
(45) Date of Patent: Dec. 1, 2020

(54) ADAPTIVE LIGHTING SYSTEM

(71) Applicant: Indian Motorcycle International, LLC, Medina, MN (US)

(72) Inventor: Jacob R. Horn, North Branch, MN (US)

(73) Assignee: Indian Motorcycle International, LLC, Medina, MN (US)

( * ) Notice: Subject to any disclaimer, the term of this patent is extended or adjusted under 35 U.S.C. 154(b) by 0 days.

(21) Appl. No.: 16/429,410

(22) Filed: Jun. 3, 2019

(65) Prior Publication Data

US 2019/0366908 A1 Dec. 5, 2019

Related U.S. Application Data

(60) Provisional application No. 62/680,722, filed on Jun. 5, 2018.

(51) Int. Cl.
| | |
|---|---|
| *B60Q 1/10* | (2006.01) |
| *B62J 6/02* | (2020.01) |
| *B60Q 1/00* | (2006.01) |
| *B60Q 11/00* | (2006.01) |
| *F21S 41/663* | (2018.01) |
| *B60Q 1/04* | (2006.01) |
| *B62K 11/00* | (2006.01) |
| *B62J 45/415* | (2020.01) |

(52) U.S. Cl.
CPC .............. *B60Q 1/10* (2013.01); *B60Q 1/0023* (2013.01); *B60Q 1/0408* (2013.01); *B60Q 11/005* (2013.01); *B62J 6/02* (2013.01); *F21S 41/663* (2018.01); *B60Q 2300/136* (2013.01); *B62J 45/4151* (2020.02); *B62K 11/00* (2013.01)

(58) Field of Classification Search
CPC ...... B60Q 1/10; B60Q 1/0023; B60Q 1/0408; B60Q 11/005
See application file for complete search history.

(56) References Cited

U.S. PATENT DOCUMENTS

| | | | |
|---|---|---|---|
| 6,490,512 B1 | 12/2002 | Niggemann | |
| 2004/0061450 A1 | 4/2004 | Ito et al. | |
| 2005/0270785 A1* | 12/2005 | Gropp | B60Q 1/18 362/475 |

(Continued)

FOREIGN PATENT DOCUMENTS

| | | |
|---|---|---|
| DE | 10 2016 107 233 A1 | 10/2016 |
| EP | 2 669 114 A2 | 12/2013 |

(Continued)

OTHER PUBLICATIONS

International Search Report and Written Opinion dated Jan. 29, 2020 in corresponding PCT Applicaion No. PCT/US2019/035426.

*Primary Examiner* — Anabel Ton
(74) *Attorney, Agent, or Firm* — Harnes Dickey

(57) ABSTRACT

A lighting system and method of operating the same for a vehicle having a vehicle structure includes a plurality of primary low beam elements and a plurality of secondary low beam elements. The system further includes a primary high beam element and a secondary high beam element. A lean angle sensor is coupled to the vehicle structure. A controller is coupled to the lean angle sensor controlling the primary low beam elements, the secondary low beam element and the secondary high beam element in response to the lean angle.

16 Claims, 25 Drawing Sheets

(56) References Cited

U.S. PATENT DOCUMENTS

| | | | | |
|---|---|---|---|---|
| 2010/0168958 A1* | 7/2010 | Baino | ........................ | B62J 6/02 |
| | | | | 701/36 |
| 2015/0081168 A1* | 3/2015 | McWithey | ............. | B60Q 1/115 |
| | | | | 701/36 |
| 2017/0182930 A1* | 6/2017 | Sakamoto | ................ | B60Q 1/10 |

FOREIGN PATENT DOCUMENTS

| | | | | |
|---|---|---|---|---|
| EP | 2 676 839 A1 | 12/2013 | | |
| EP | 2 676 872 A1 | 12/2013 | | |
| EP | 2669114 A2 * | 12/2013 | ........... | B60Q 1/0041 |
| EP | 2 792 546 A1 | 10/2014 | | |
| EP | 3 000 700 A1 | 3/2016 | | |
| EP | 3000700 A1 * | 3/2016 | ........... | B60Q 1/1423 |
| FR | 2 900 534 A1 | 11/2007 | | |
| JP | 2008-001305 A | 1/2008 | | |
| JP | 2016-015303 A | 1/2016 | | |

\* cited by examiner

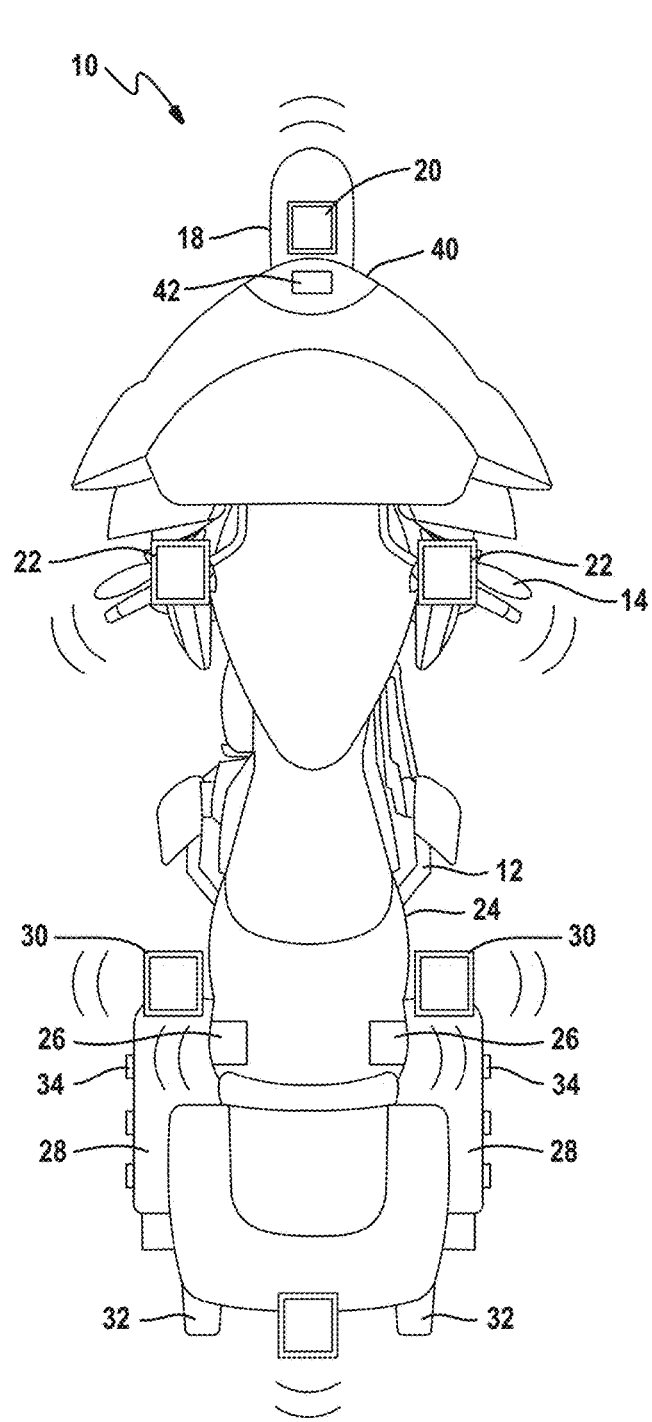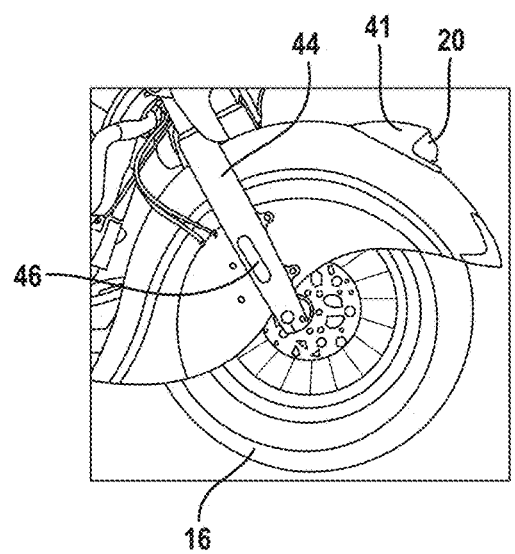
FIG. 1A
FIG. 1B

ADAPTIVE LIGHTING SYSTEM

CROSS-REFERENCE TO RELATED APPLICATIONS

This application is a non-provisional application of provisional application 62/680,722, filed Jun. 5, 2018, the disclosure of which is incorporated by reference herein.

FIELD

The present disclosure relates to an adaptive lighting system for a vehicle, more particularly, to an adaptive lighting system that compensates for vehicle conditions.

BACKGROUND

This section provides background information related to the present disclosure which is not necessarily prior art.

A driver of a vehicle should have awareness of the surrounding environment to maximize safety. Vehicles require headlights for improving visibility at night. Further, various other types of electronics such as radar may also be used in a vehicle to improve and sense various conditions.

Certain vehicles such as motorcycles have a frame that moves relative to the road. That is, a motorcycle operator leans the frame of the vehicle during a turn. Because headlights and sensors are mounted to the vehicle or frame, the direction of the lights and sensors is also oriented in a sub-optimum position during leaning. For example, a headlight may illuminate the actual road directly in front of the vehicle rather than providing a beam down the road. Radar sensors or other types of sensors may also be misdirected.

Illuminating the road in front of the vehicle as well as down the road of the vehicle is important for the driver being aware of the curvature of the road ahead and objects in the road, as well as other drivers being aware of the vehicle.

SUMMARY

This section provides a general summary of the disclosures, and is not a comprehensive disclosure of its full scope or all of its features.

The present disclosure provides a system and method for directing headlights of a vehicle such as but not limited to a motorcycle. The present disclosure provides a method for adapting low beams, high beams or both according to the vehicle angle to provide better visibility of the vehicle to oncoming drivers and to provide better visibility to the driver.

In one aspect of the disclosure, a lighting system for a vehicle having a vehicle structure includes a plurality of primary low beam elements, a plurality of secondary low beam elements, a lean angle sensor coupled to the vehicle structure and a controller coupled to the lean angle sensor controlling the primary low beam elements and the secondary low beam elements in response to the lean angle.

In another aspect of the invention, a lighting system includes a primary high beam element, a secondary high beam element, a lean angle sensor coupled to the vehicle structure and a controller coupled to the lean angle sensor controlling the secondary high beam element in response to the lean angle.

In another aspect of the disclosure, a method includes determining a lean angle of the vehicle, selectively controlling primary low beam elements in response to the lean angle and selectively controlling secondary low beam elements in response to the lean angle.

In yet another aspect of the disclosure, an adaptive light assembly for a vehicle comprising a light control module control module with a first fault detection module comprises light controlling circuitry comprising a second fault detection module. The second fault detection module detects a fault within the adaptive lights. A switching circuit is coupled to the light controlling circuitry to simulate an error detectable by the first fault detection module.

In another aspect of the disclosure, a method of indicating a fault in a light assembly comprises coupling an adaptive light assembly to a vehicle light driving control module. The light assembly comprises light controlling circuitry comprising a first fault detection module. The method includes detecting a fault within the light assembly, controlling a switch within the light assembly to generate a change in an electrical characteristic of a connection to a vehicle light driving control circuit, detecting the change in electrical characteristic at the vehicle light driving control module and controlling a fault indicator in response to the change in the electrical characteristic.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected examples and not all possible implementations, and are not intended to limit the scope of the present disclosure.

FIG. 1A is a top view of vehicle such as a motorcycle having a headlight and various sensor locations.

FIG. 1B is a front wheel assembly of the vehicle of FIG. 1A.

Corresponding reference numerals indicate corresponding parts throughout the several views of the drawings.

DETAILED DESCRIPTION

Example embodiments will now be described more fully with reference to the accompanying drawings. Although the following description includes several examples of a motorcycle application, it is understood that the features herein may be applied to any appropriate vehicle, such as snowmobiles, all-terrain vehicles, utility vehicles, moped, scooters, etc. The examples disclosed below are not intended to be exhaustive or to limit the disclosure to the precise forms disclosed in the following detailed description. Rather, the examples are chosen and described so that others skilled in the art may utilize their teachings.

Figure 1C:
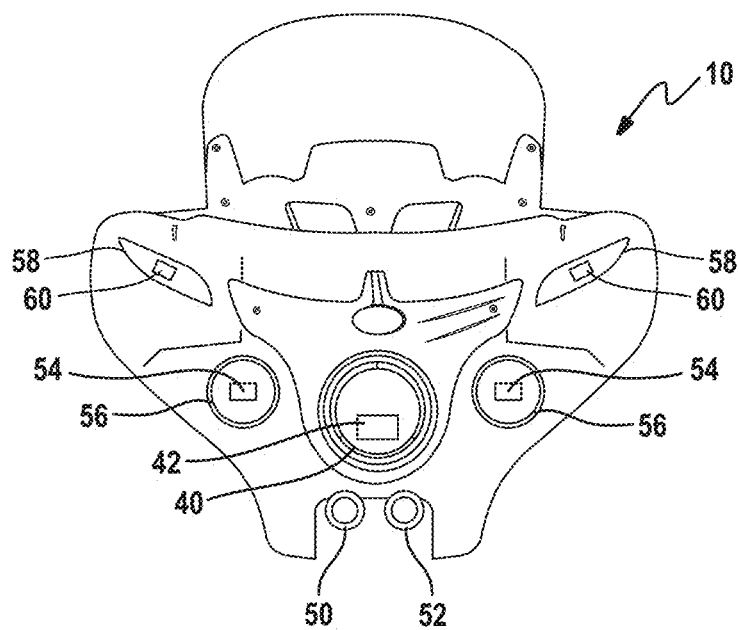
FIG. 1C is a partial front view of the vehicle of FIG. 1A.

Referring now to FIGS. 1A-1D, a vehicle 10 such as a motorcycle is set forth. The motorcycle includes various mounting configurations for vehicle sensors. In FIG. 1A, a top view of the vehicle is illustrated. The vehicle sensors may be mounted in various locations of the vehicle. The sensors may be incorporated within different types of light housings. This allows designers to maintain an aesthetically pleasing appearance without sensor locations being obvious. The vehicle 10 includes a frame 12, handlebars 14 and a pair of wheels 16, one of which is illustrated in FIG. 1B. The front wheel may be enclosed by a fender 18 on which a sensor 20 is mounted. As mentioned above, the sensor 20 may be incorporated within a light housing 41 or other decorative trim disposed on the fender 18. The sensor 20 may be, but is not limited to, radar, lidar or other proximity sensors.

Sensors 22 may be coupled to the steering mechanism 14 of the vehicle. The sensors 22 may be directed in various directions including toward the side of the vehicle 10. The frame, highway bars and lower fairings are suitable places to mount sensors 22.

The vehicle 10 may also include a seat 24. Seat 24 may include sensors 26 directed at lateral sides of the vehicle 10.

The vehicle 10 may also include saddlebags 28. The saddlebags 28 may have various sensors incorporated therein. The sensors may include a front-facing sensors 30, rear-facing sensors 32 or side-facing sensors 34.

The vehicle 10 may also include a headlight assembly 40. The headlight assembly 40 may be an adaptive headlight, as will be described in more detail below. In addition, the headlight assembly 40 may include a sensor 42 such as a visibility sensor.

Referring now specifically to FIG. 1B, the vehicle 10 may include a fork 44 used for securing the front wheel 16 to the frame. A side-mounted sensor 46 may be used for sensing adjacent vehicles. One sensor 46 may be used on either side of the wheel 16 on each fork 44.

Referring now to FIG. 1C, a front view of the vehicle 10 is illustrated in further detail. In this example, the sensor 42 may be enclosed within the headlight 40 as illustrated in FIG. 1A. However, various other locations for a sensor include a sensor 50, 52 positioned below the headlight 40. Other sensors 54 may be located within the driving lights 56. Sensors 60 may be located in the turn signals 58.

Figure 1D:
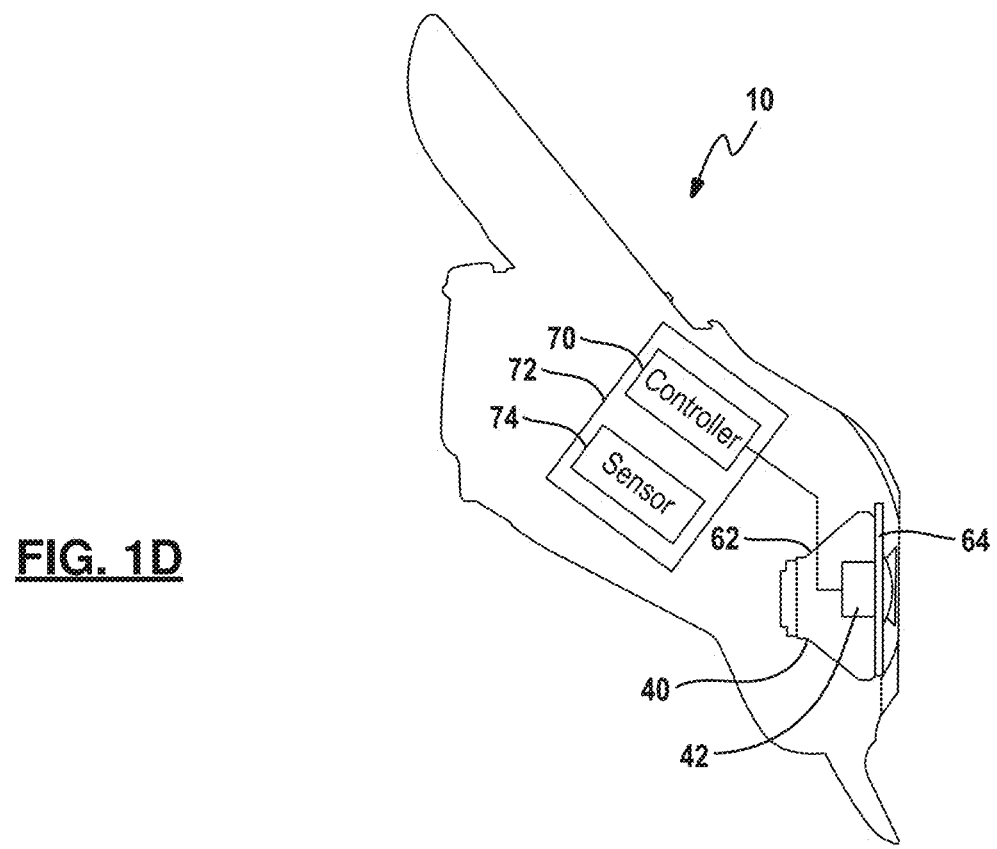
FIG. 1D is a side cutaway view of the partial front of the vehicle of FIG. 1C.

Referring now specifically to FIG. 1D, a portion of the vehicle 10 has been cut away. By positioning the sensors such as the sensor 42 between a light housing 62 and a lens 64 of the headlight assembly 40, the controller 70 may be located in a remote location. That is, the controller 70 may be positioned in a more favorable environment in terms of heat and moisture. In the present example, the controller 70 is located within the instrument panel of the vehicle 10. This allows the controller 70 which is microprocessor based to operate in more favorable positions. The controller 70 may be located within a common housing 72 with a sensor 74, which may be an inertial sensor sensing the attitude of the vehicle. The controller 70 may be incorporated as part of a vehicle control module (VCM).

Figure 2:
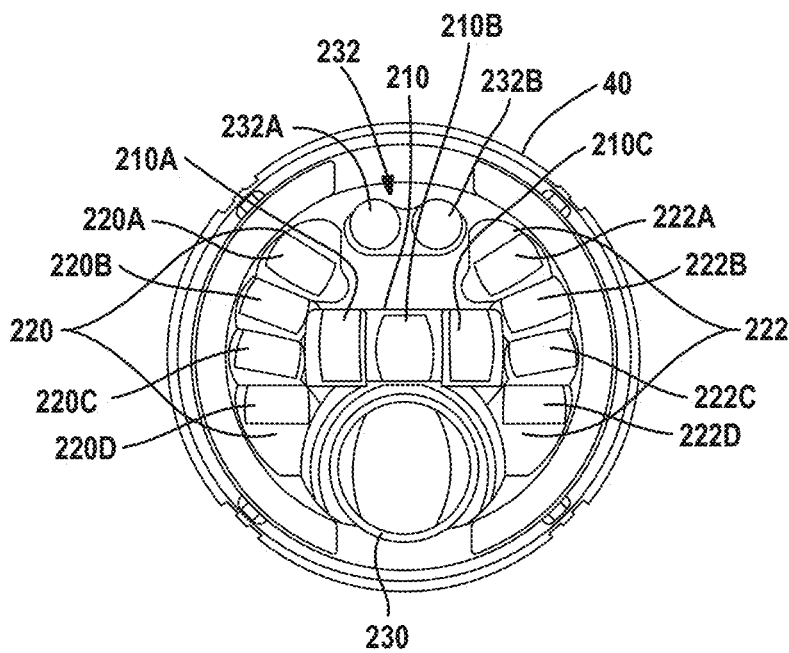
FIG. 2 is a front elevational view of a headlight according to one example of the invention.

Referring now to FIG. 2, the headlight assembly 40 is illustrated in further detail. In this example, a primary portion 210 of low beam elements is set forth. The low beam elements 210A, 210B and 210C form a primary portion or first portion 210 of the low beam. In this example, elements 210A and 210C are adaptive, meaning that they are controlled to be on (emitting light) or off (non-light emitting) depending upon the lean angle of the vehicle, as will be further described below. A first secondary portion 220 of the low beam may be formed using a plurality of elements 220A, 220B, 220C and 220D. A second secondary portion 222 of the low beam may be formed by elements 222A, 222B, 222C and 222D. As is illustrated in this example, four lenses are used to form the first secondary portion 220 and the second secondary portion 222. However, various numbers of elements may be used.

The elements 220A-220D and 222A-222D may be disposed at least partially around the periphery of the light housing. The elements 220A-220D and 222A-222D may be generally rectangular in shape and extend radially inward. However, other shapes and sizes may be used. Further, each element or several elements may be differently shaped.

A high beam having a primary portion 230 is also illustrated. The primary portion 230 may be a single lens as is illustrated in the present example.

A secondary portion 232 of the higher beam is also set forth. The secondary portion 232 of the high beam may include a first lens 232A and a second lens 232B. The secondary portion 232 of the high beam may be adaptive in that one or the other or both of the elements 232A, 232B may be activated or light-emitting depending upon the various conditions of the vehicle such as the lean angle.

Figure 3:
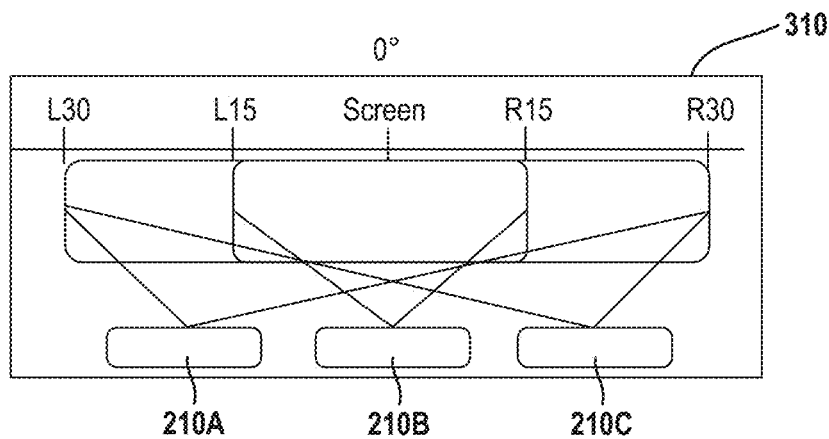
FIG. 3 is a diagrammatic view of the light output of a first example of primary elements.

Referring now to FIG. 3, the light output of the primary low beam elements 210A, 210B and 210C are illustrated. The screen has markings at 0 degrees which represents the center in front of the vehicle, L15 which represents 15 degrees from the center toward the left and L30 which represents 30 degrees to the left of center. Likewise, the screen also has a position marked R15 for 15 degrees to the right of center and R30 for 30 degrees to the right of center. In this example, lens 210B is shaped to illuminate the area between L15 and R15. Lens 210A is shaped to illuminate the area between L30 and R30. Likewise, lens 210C also illuminates the area between L30 and R30.

Figure 4:
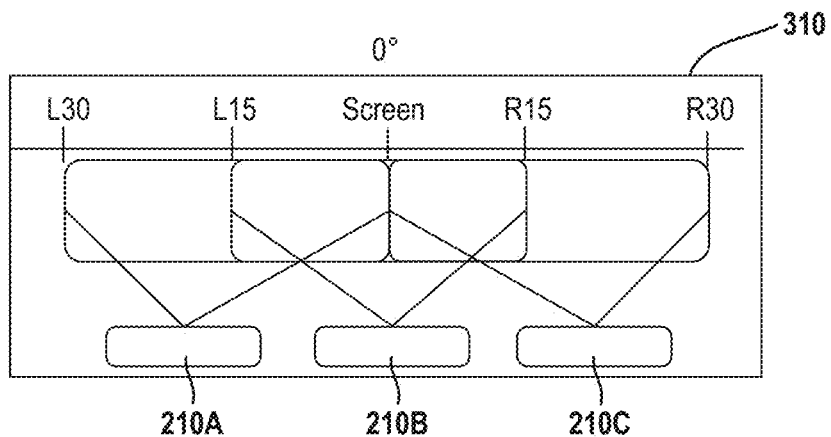
FIG. 4 is a second example of light output of a second example of primary elements of a low beam.

Referring now to FIG. 4, the screen 310 is illustrated in a similar manner. However, the lenses for each of the elements 210A, 210C are changed to direct light in a different direction. That is, element 210A illuminates the area between 0 degrees and L30. Element 210B illuminates the area between L15 and R15, as set forth in FIG. 3 and element 210C illuminates the area between 0 degrees and R30. Depending upon the configuration of the vehicle 10, either of the examples set forth in FIG. 3 or 4 may be implemented.

During operation, the elements 210A-210C of the low beam may be selectively activated. In a standard driving mode in which the vehicle is relatively straight, that is, with no lean angle, all of the elements 210A-210C may be used to illuminate the road surface. However, as the vehicle begins to lean in either direction, the individual elements 210A, 210C may be turned off or reduced in intensity to prevent objects that are not in the path of travel from being illuminated. A reduction in intensity may be about 25 percent of the "on" intensity. That is, as the vehicle is driven, and the vehicle leans, the elements 210A and 210C may be selectively controlled to "off" or reduced intensity in response to the lean angle of the vehicle. That is, selective control of elements 210A and 210C may be between 0 and 100 percent.

Figure 5:
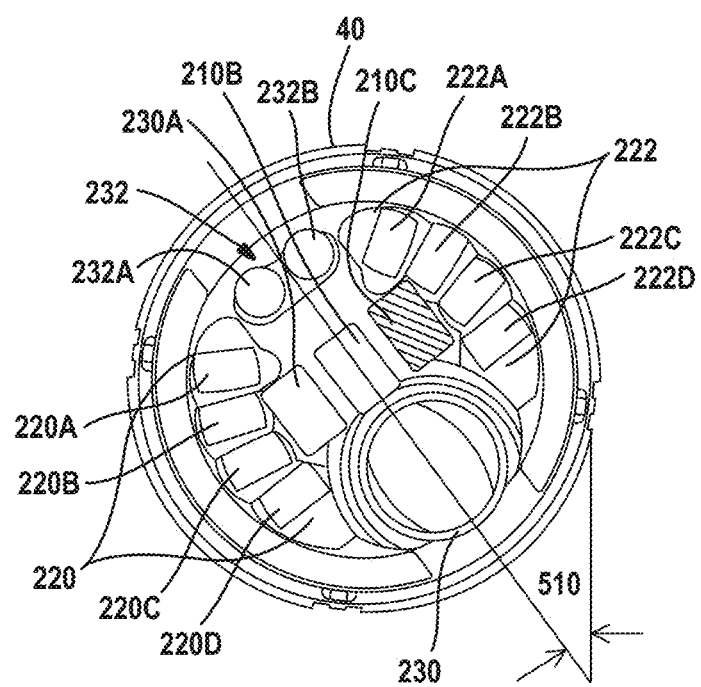
FIG. 5 is a diagrammatic view of a headlamp in an angular position relating to a lean angle.

Referring now to FIG. 5, the headlight 40 illustrated in FIG. 2 is set forth at an angle 510 corresponding to the lean angle of the vehicle.

Figure 6A:
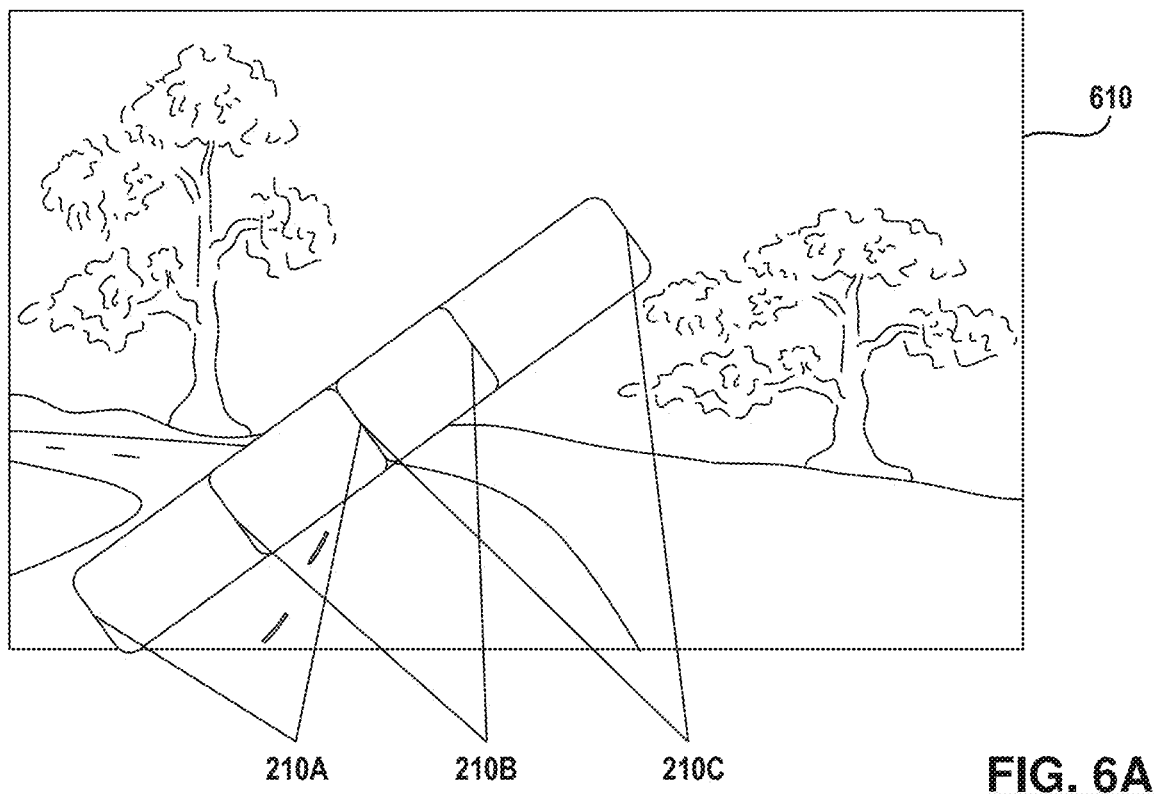
FIG. 6A is the output of the light element of FIG. 5 corresponding to a lean angle.

Referring now to FIG. 6A, a simulated view of a landscape including a road 610 is illustrated. In this example, the light is generated using the primary low beam light that is illuminating various portions in a manner similar to that set forth above with respect to FIG. 4. In this example, however, the element 210C is not illuminated or is reduced to about 25 percent of the fully "on" intensity to reduce driver distraction and help the driver focus on the path. Element 210C is illuminating above the travelled direction.

Figure 6B:
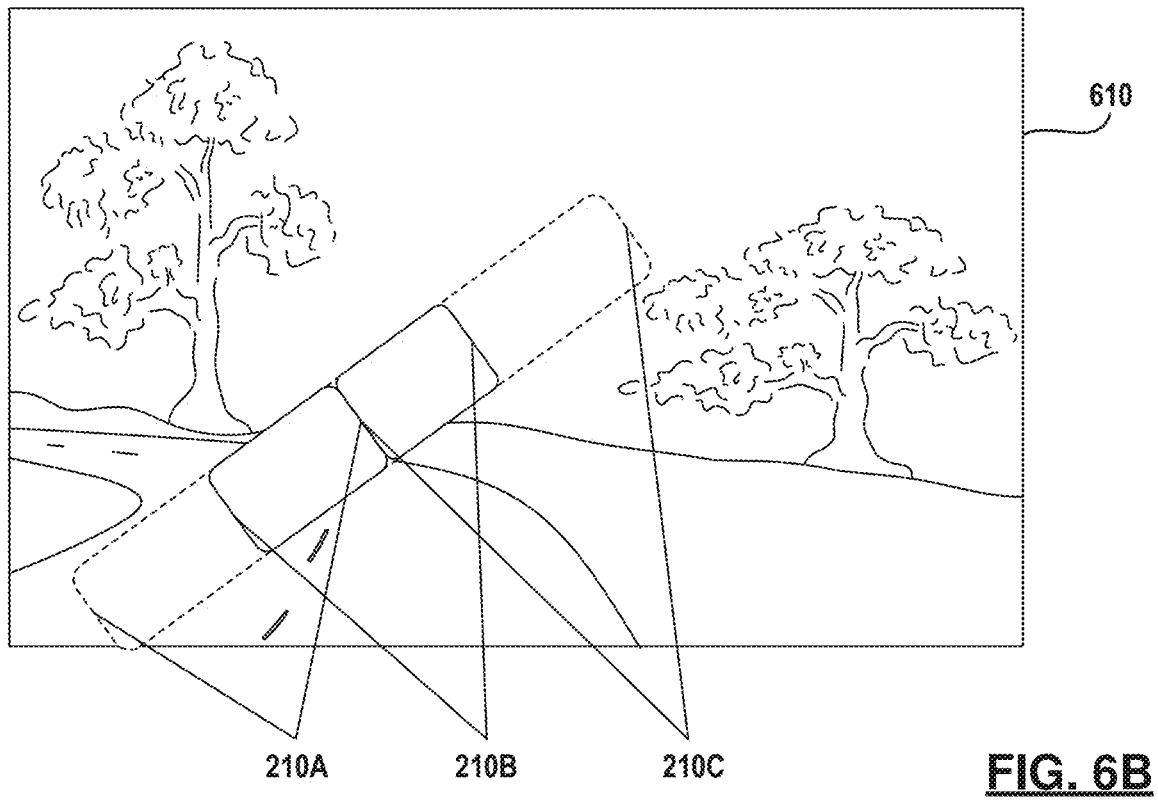
FIG. 6B is the light output of the middle low beam element of FIG. 5.

FIG. 6B is a simulated view similar to FIG. 6A operating with a single low beam element 210B.

Figure 7A:
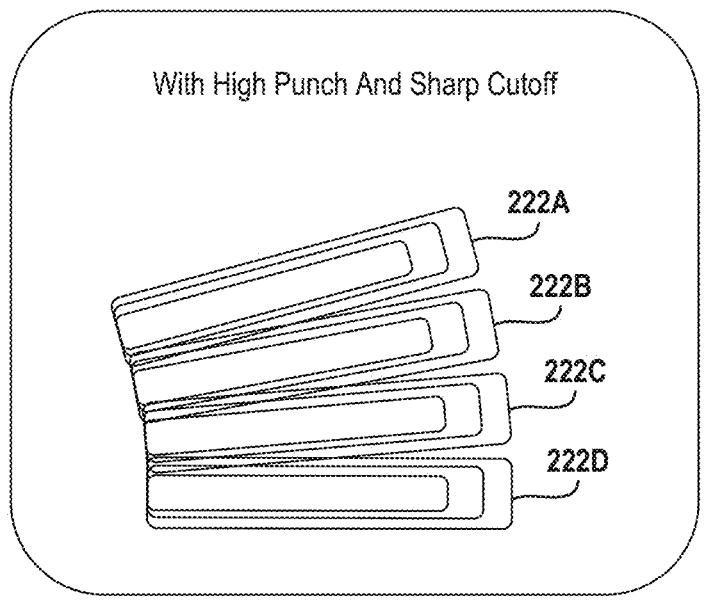
FIGS. 7A and 7B are two different examples of secondary elements of a low beam.
Figure 7B:
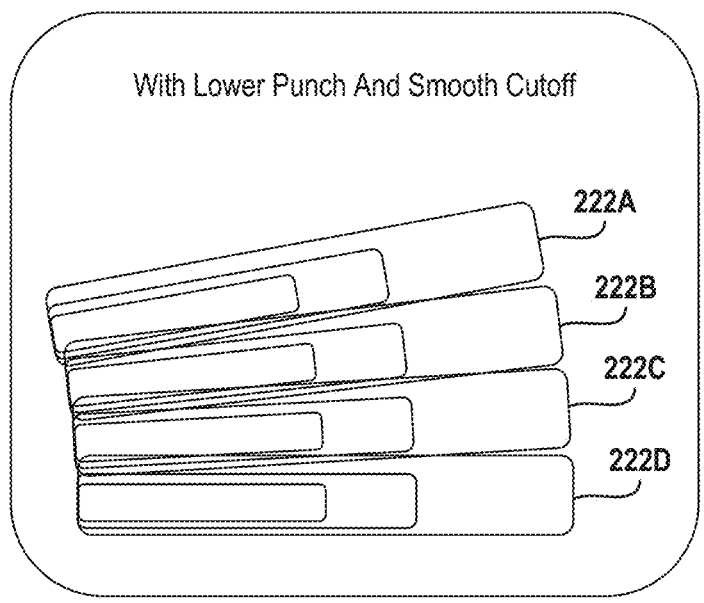

Referring now to FIG. 7A, a light output plot of the output of the secondary portion 222 is set forth. In this example, all of the light from elements 222A-222D is illustrated for comparison purposes. The light output for all elements 220A-220D is the mirror image. In this example, the shape of the lenses corresponding to the elements may be shaped differently in FIGS. 7A and 7B. In FIG. 7A, a high punch output beam is illustrated for each of the elements. Although the elements are not shown, the output of the elements is shown by the reference numerals. When contrasting FIGS. 7A and 7B, FIG. 7A has higher punch and sharp cutoff which shows a greater amount of light directed to the edges of the corresponding element. In FIG. 7B, the intensity of the light is reduced toward the rightmost edge of each element. Depending on the various types of vehicles and the desired engineering requirements, a suitable shape for the elements 222A-222D to achieve the punch or cutoffs may be selected by a vehicle design. As the vehicle 10 leans, the elements 222A-222D may be selectively and sequentially illuminated to provide the desired light output.

Figure 8A:
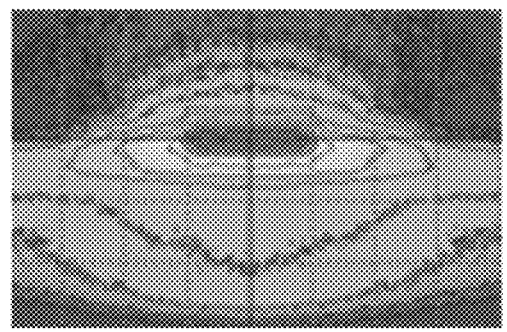
FIGS. 8A-8E are light plots of the output of primary and secondary high beams of FIG. 2.
Figure 8B:
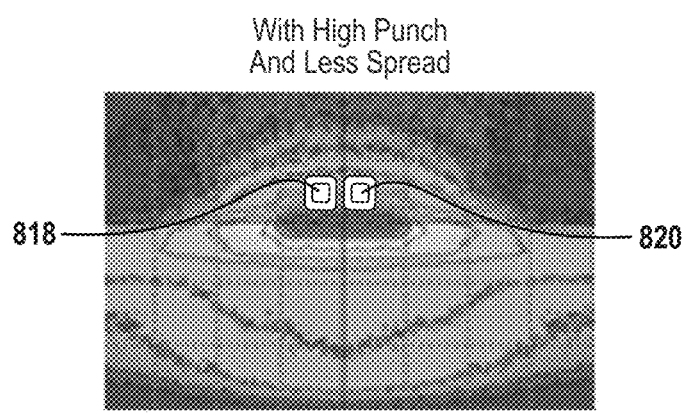
Figure 8C:
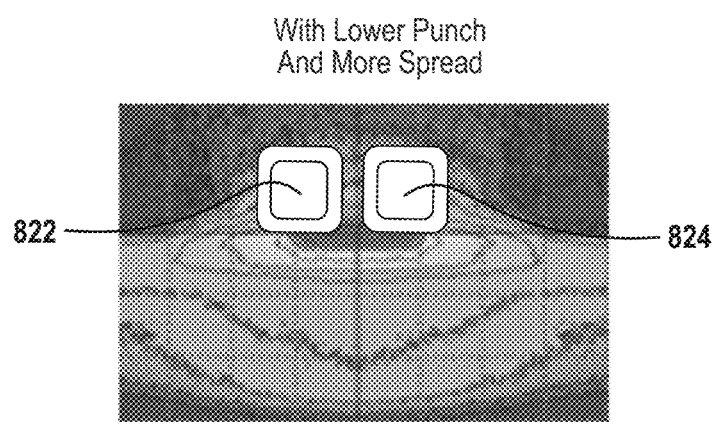

Referring now to FIGS. 8A-8C, the output for the adaptive high beams is illustrated. In FIG. 8A, the screen plot of the light output of the primary element 230 illustrated in FIG. 2 is set forth. In FIG. 8B, both of the secondary elements 232A and 232B form the elements 818 and 820 on the screen. As is illustrated, the output of the combination of the primary element 230 and the secondary elements 232A, 232B provide high punch and less spread. However, should lower punch and more spread be desirable, the shape of the lenses of the elements 232A and 232B may be changed so that the light output corresponding to the boxes 822 and 824 are formed by the high beams.

Figure 8D:
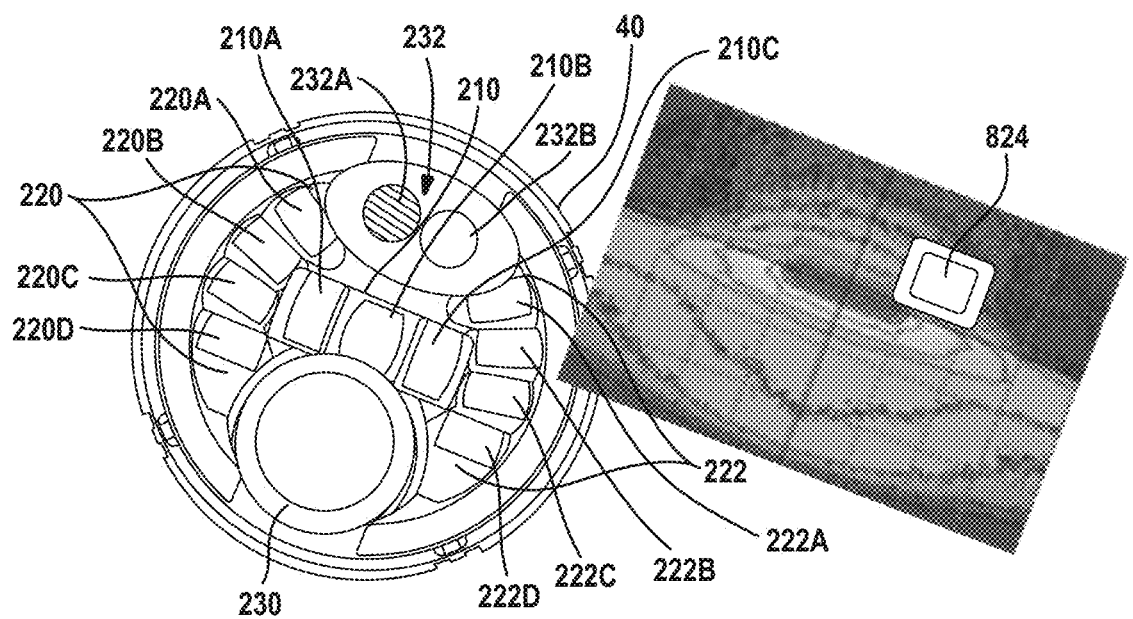

Referring now to FIG. 8D, the elements 232A and 232B may be selectively used to generate a light output. In this example, the light and thus the lean angle of the vehicle is toward the left. When the vehicle leans toward the left, directing the high beam corresponding to the element 232A is undesirable. In this example, element 232A is shut off and thus only the output of element 232B is provided. That is, FIG. 8C is translated to the angular position while one of the boxes, corresponding to 822, is shut off or not illuminating.

Figure 8E:
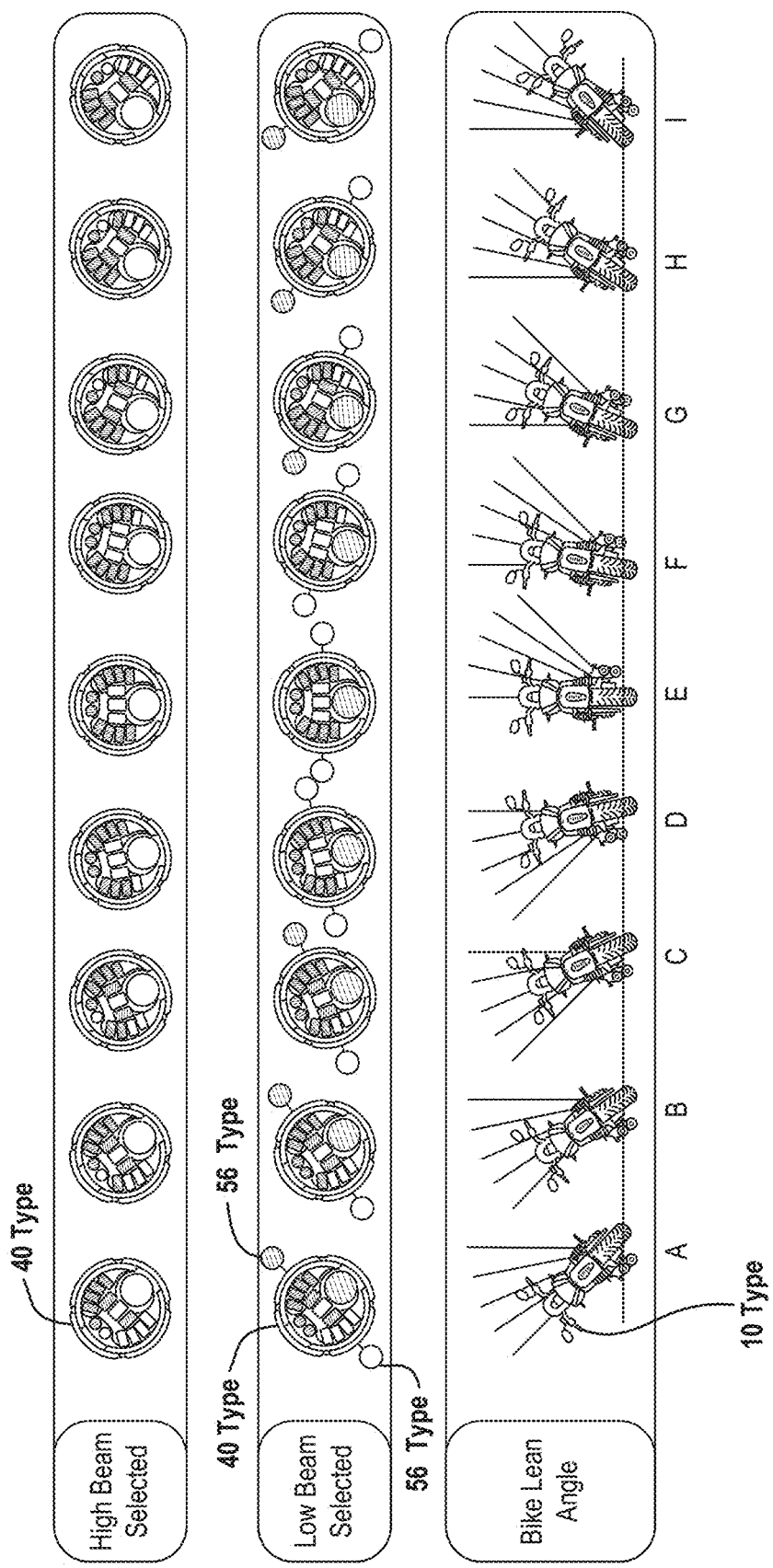

In FIG. 8E, an alternate control scheme for high, low beam lights and driving lights is illustrated at various lean angles. The position E corresponds to straight up where the three primary low beam elements are illuminated. Once enough lean angle is detected, the secondary low beams begin to illuminate depending on the direction. Once the lean angle is over a predetermined amount, only the central primary element is illuminated along with more secondary elements. Eventually, in positions A and I, four secondary elements and one primary low beam element are illuminated. The primary low beam elements act the same when high beams are selected. However, once the predetermined angle increases, the secondary high beam element is illuminated in the direction of the lean angle.

Figure 9A:
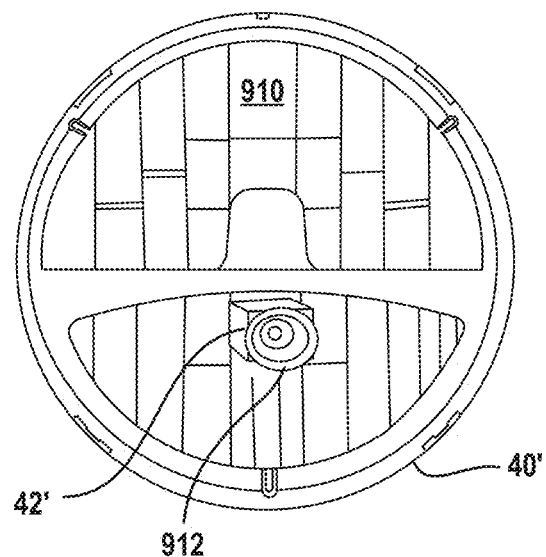
FIGS. 9A and 9B are front and side views of a sensor housed within a light assembly.
Figure 9B:
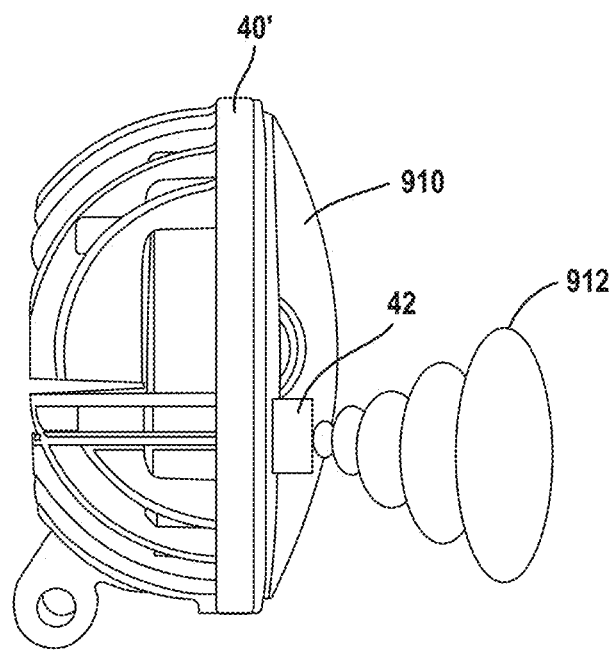

Referring now to FIGS. 9A and 9B, a simplified version of a headlight 40' is illustrated. The headlight 40' may include the sensor 42' housed therein. The sensor 42' may, for example, be a radar sensor or optical sensor. Of course, the light 40' may include one of more of the elements set forth in FIG. 2. The sensor 42' is preferably placed behind the outer lens covering 910 so that the radar beam 912 is emitted therethrough.

Although a headlight 40' is illustrated, the sensor 42' may be included in various types of light housings such as a brake light, an auxiliary light, a turn signal or the like. A number of different locations of lights or other locations on the vehicle were illustrated in FIG. 1A.

Figure 10A:
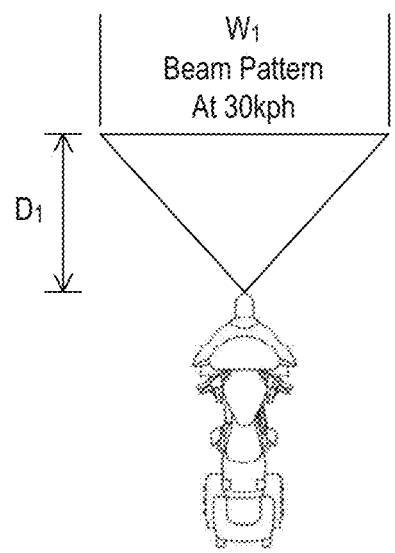
FIGS. 10A-10C are diagrammatic views illustrating different light patterns corresponding to different speeds of the vehicle.
Figure 10B:
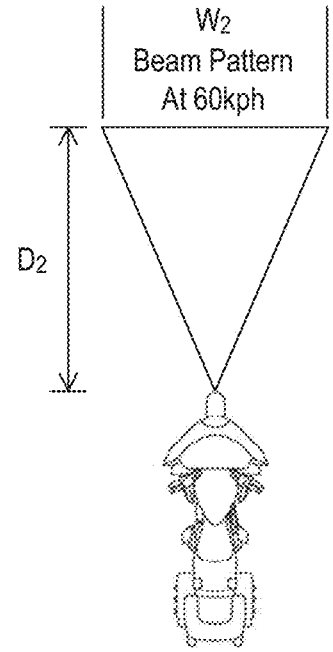
Figure 10C:
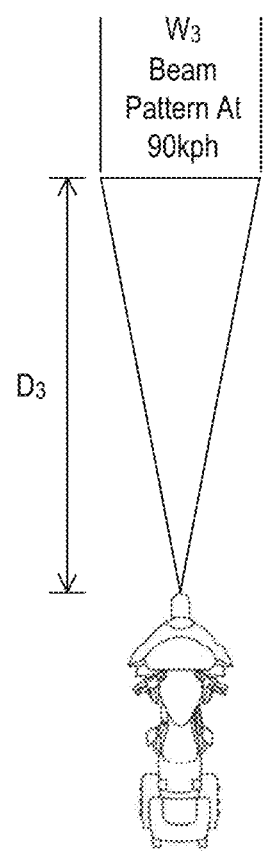

The headlight 40' may also be an adaptive headlight for changing the length of the beam pattern emitted from the vehicle. As illustrated in FIGS. 10A-10C, the beam pattern illustrated is wider $W_1$ and shorter $D_1$ at lower speeds such as 30 kilometers per hour illustrated in FIG. 10A. In FIG. 10B, the beam pattern is at a mid-range (length $D_2$ and width $W_2$) at 60 kilometers per hour and the beam pattern is at a far range $D_3$ and narrower width $W_3$ at 90 kilometers per hour as illustrated in FIG. 10C. The distance D1, D2 and D3 may be calculated based upon a time. Therefore, the distance may correspond to a time for seeing ahead 6 seconds. Thus, although the distances D1-D3 are different, the amount of length or the time in front of the vehicle that is illuminated may be the same. Thus, based upon a speed, the amount of beam pattern ahead of the vehicle may be calculated.

Figure 11:
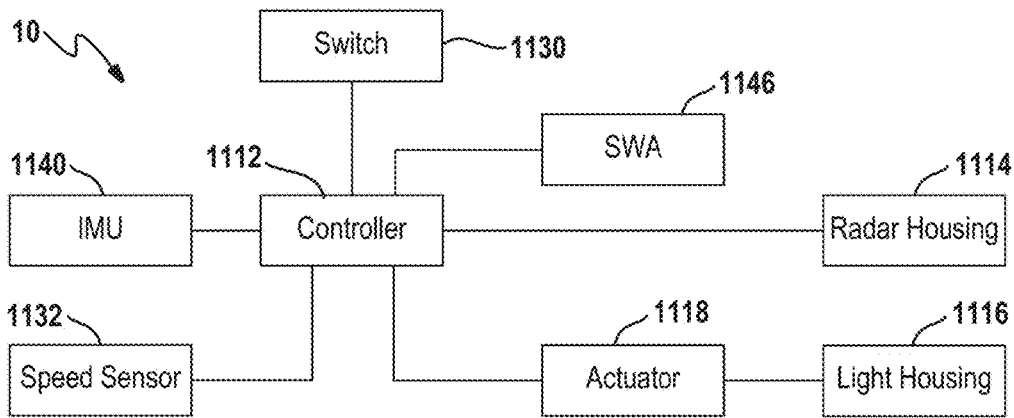
FIG. 11 is a diagrammatic view of the control system according to the present disclosure.

Referring now to FIG. 11, a block diagrammatic view of the control system 1110 is illustrated. In the example, a controller 1112 that may correspond to the controller 70 illustrated in FIG. 1D is set forth. In this example, the control system 1110 may control the operation of a radar housing 1114 or a light housing 1116. That is, the controller 1112 may control the output of the radar within the radar housing 1114. The controller 1112 may also control the light housing 1116 by controlling an actuator 1118 to adjust the focal length of the system by moving the outer lens a small distance to correspond to the desired distance for the amount of illumination to be provided by the light housing. The actuator 1118 may be a small motor that moves the lens or changes the pressure within a water- or oil-filled membrane. An example of this will be set forth below in FIG. 14.

A switch 1130 may be in communication with the controller 1112. The switch 1130 may be used for selecting between a low beam headlight output or a high beam headlight output.

A speed sensor 1132 may provide a speed of the vehicle to the controller 1112. Various types of speed sensors may be used including conventional rotational sensors coupled to the vehicle wheels.

The controller 1112 may also be in communication with an inertial measurement unit 1140. The inertial measurement unit 1140 may be one or more sensors used for sensing various types of movement of the vehicle. The inertial measurement unit 1140 may generate signals for lateral acceleration, longitudinal acceleration and vertical acceleration. The inertial measurement unit 1140 may also generate signals corresponding to a roll moment, a yaw moment and a pitch moment. The lean angle of the vehicle may be calculated using the yaw moment and roll moment.

A steering wheel angle sensor 1146 may also be incorporated into the system. The steering wheel angle sensor 1146 may provide a steering wheel angle corresponding to the angle of the front wheel relative to the frame of the vehicle. Various sensors may be used for controlling the distance the light projects from the vehicle and for controlling the number of primary low beam elements, the number of secondary low beam elements and the number of secondary high beam elements based upon a lean angle of the vehicle.

Figure 12:
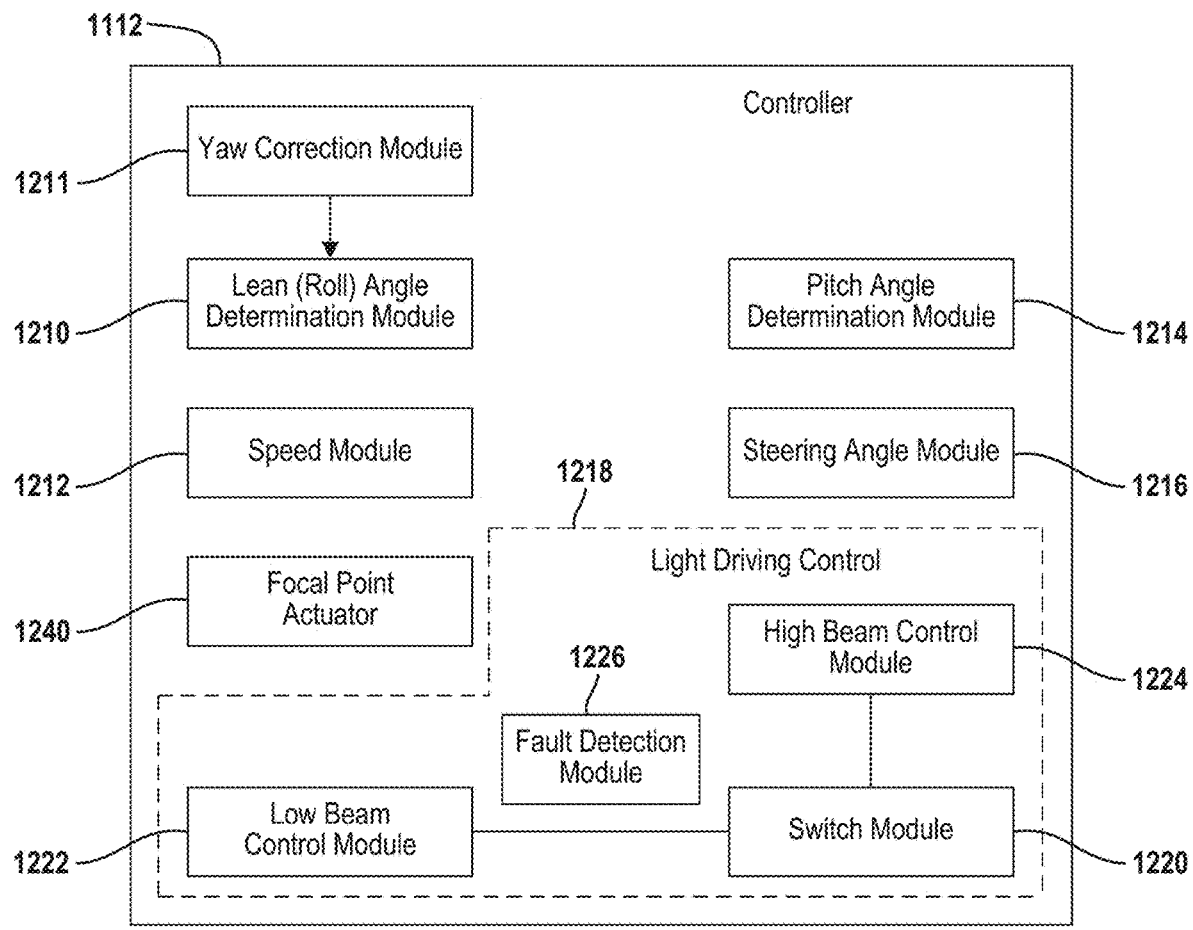
FIG. 12 is a block diagrammatic view of the controller of FIG. 11.

Referring now to FIG. 12, a block diagrammatic view of the controller 1112 of FIG. 11 is illustrated in further detail. In this example, various modules within the controller 1112 determine the various light elements that are illuminated. For example, a lean angle determination module 1210 determines the lean angle from the inertial measurement unit 1140. In particular, the lean angle corresponds generally to the roll angle of the vehicle. However, as described below, a correction based on yaw angle in the yaw correction module 1211. Thus, the output of the lean angle determination module 1210 is a lean angle signal.

A speed module 1212 generates a speed signal from the output of the speed sensor 1132. The speed module may, for example, receive a plurality of pulses from the speed sensor 1132 and convert the pulses to a vehicle speed.

A pitch angle determination module 1214 determines a pitch angle from the inertial measurement unit 1140. The pitch angle may be used for compensating the direction of the headlights based upon a load. That is, more than just side-to-side movement of the light may be compensated for. If the pitch angle of the vehicle indicates the front end of the vehicle is higher than the rear end of the vehicle, the light may be actuated into a more downward position using the actuator 1118 illustrated above.

The steering angle module 1216 generates a steering wheel angle signal from the steering wheel sensor 1146. The steering wheel angle may be used to determine the direction of the vehicle to determine the elements desired for illumination.

A light driving control module 1218 is used to control modes of operation of the adaptive light. In particular, the light driving control module controls the high beam, low beam and switching therebetween. A switch control module 1220 may receive a switch signal from a switch and provide an output to a low beam control module 1222 and a high beam control module 1224. That is, the switch module 1220 may generate an indication as to whether a high beam or low beam is desired by the vehicle. In response to the lean angle 1210 or lean angle corrected by the yaw angle acceleration, the primary elements and secondary elements of the low beam and the high beam may be controlled in the desired manner as described above. A focal point actuator 1240 may control the focal point of the light housing 1116 so that a desired focal point and thus the beam pattern of illumination in front of the vehicle may be changed.

Figure 13:
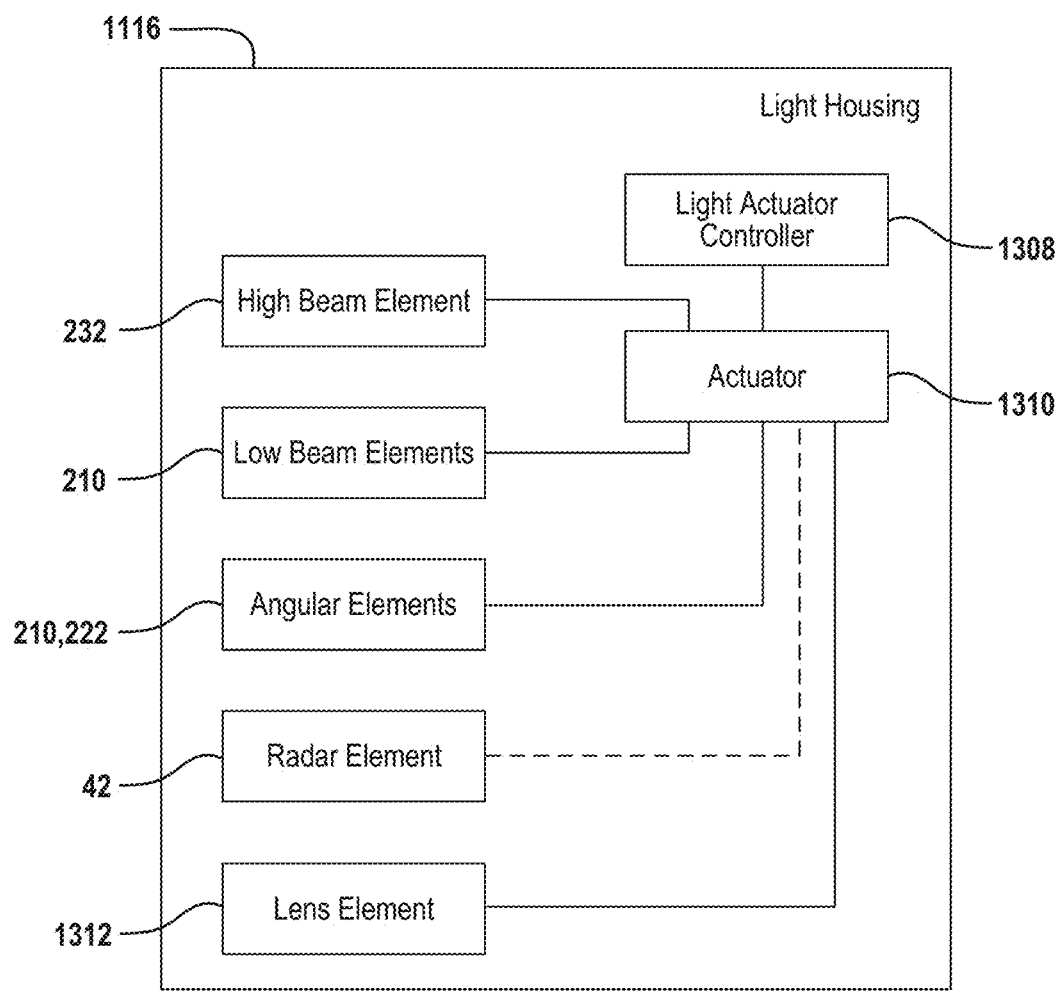
FIG. 13 is a block diagrammatic view of one example of a light housing.

Referring now to FIG. 13, the light housing 1116 is illustrated in further detail. The light housing 1116 may include an actuator controller 1308 and an actuator 1310 as mentioned above. The controller 1308 and actuator 1310 may be within the housing or external to the housing, as illustrated in FIG. 11 as 1118. The actuator 1310 may pressurize oil for changing the shape of the lens element or changing the position of the lens element relative to the light emitters. The light emitters may, for example, be LEDs or incandescent lights. The LED light emitters may also be moved while the lens is held stationary. The controller 1308 and actuator 1310 may also be connected to the secondary high beam elements 232 for controlling one or more of the high beam elements according to the lean angle of the vehicle. The primary low beam elements 210 may also be in communication with the actuator 1310 for illuminating or controlling the illumination of each individual element as described above. The secondary elements 220, 222 may also be controlled by the actuator 1310 based upon the lean angle of the vehicle. A radar element 42 may also be controlled by the actuator 1310. The separation of housing 1116 from housing 72 of FIG. 1D allows strategic positioning and incorporation of various components in each.

Figure 14:
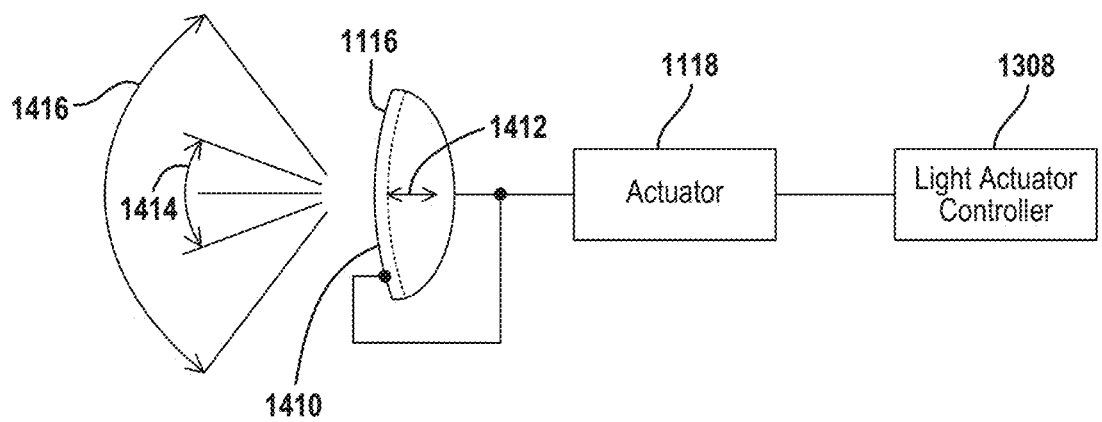
FIG. 14 is a schematic view of an actuator for controlling the focal point of a list assembly.

Referring now FIG. 14, the actuator 1118 illustrated in FIG. 11 is illustrated coupled to an external lens 1410 of the vehicle. By moving the lens 1410 in the direction indicated by the arrows 1412, the light output may be changed from a narrow beam 1414 to a wide beam 1416 and sizes therebetween. Thus, by shifting the focal point of the exterior lens 1410, the actuator 1118 provides the desired light output for the light assembly. The actuator 1118 may be an electrical motor, a hydraulic element such as an oil-filled element or a water-filled element which manipulates the exterior surface of the lens.

Figure 15:
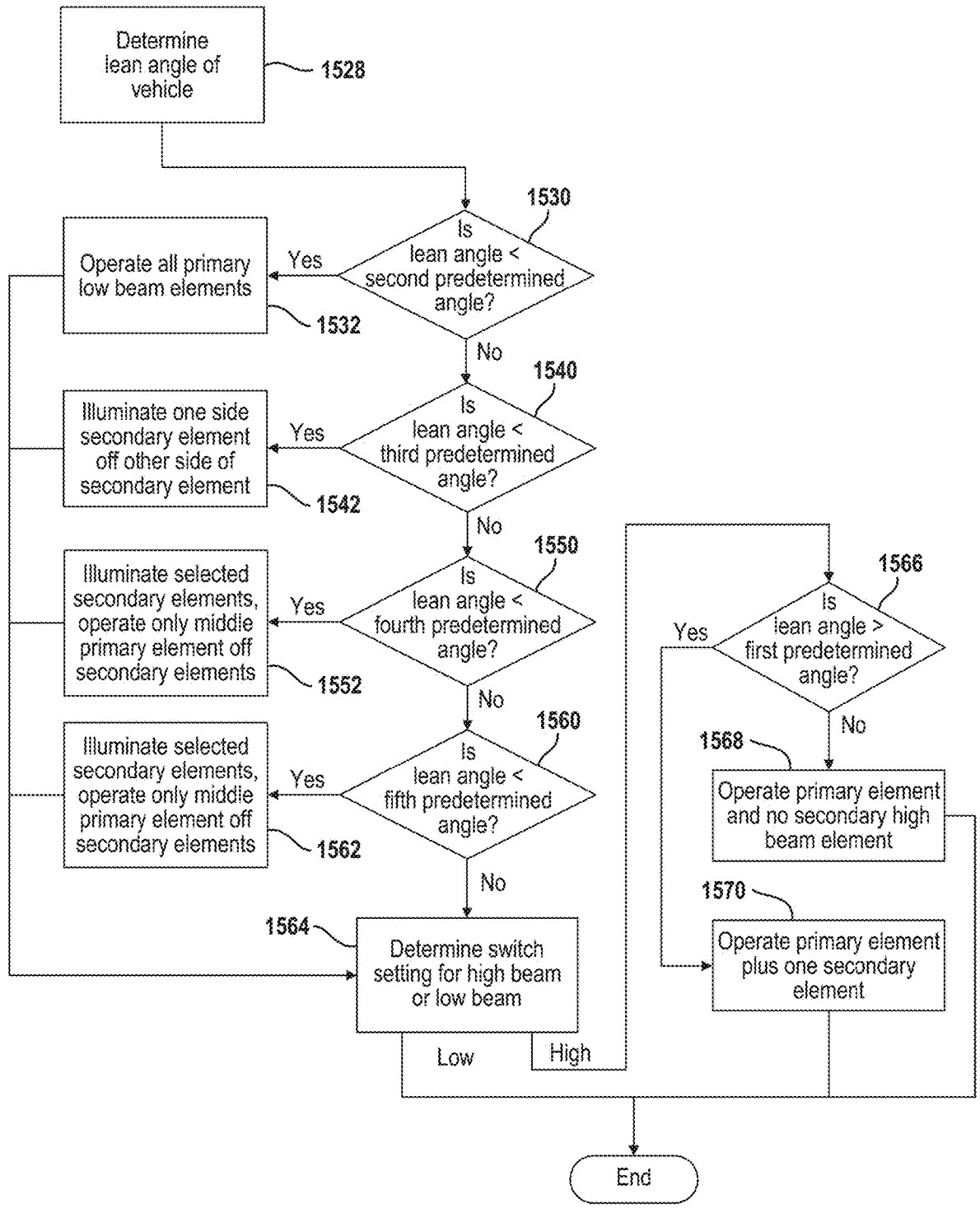
FIG. 15 is a flowchart of a method for controlling the high beams and low beams of a vehicle.

Referring now to FIG. 15, a method for controlling the headlight of a vehicle is set forth. In step 1528, the lean angle of the vehicle is continually monitored by the controller so that the appropriate elements of the high beams and low beams are illuminated or extinguished. The lean angle is determined from the inertial measurement unit set forth above. However, a discrete lean angle sensor may also be used.

Step 1530 determines whether a lean angle is less than a second predetermined angle. If the lean angle is less than a second predetermined angle, step 1532 operates all the primary low beam elements. The low beam elements may be configured in a manner to provide the light illustrated in FIGS. 3 and 4. By operating while the lean angle is less than a second predetermined angle, the vehicle is more vertical.

Referring back to step 1530, if the lean angle is not less than a predetermined angle, the lean angle is compared to various thresholds in steps 1540, 1550 and 1560. Therefore, the amount of the secondary low beam elements that are illuminated are changed. On the "low side" of the vehicle, the elements are activated one by one while the elements on the high side of the vehicle may be deactivated. This allows the illumination patterns illustrated in FIGS. 7A and 7B. As mentioned above, it is desirable not to have elements too high to dazzle oncoming drivers. Thus, in step 1540 when the lean angle is greater than a third predetermined lean angle, the appropriate secondary elements are operated. That is, the secondary low beam elements on one side are powered on or illuminated and the elements on the other side are extinguished in step 1542.

In step 1550, it is determined whether the lean angle is greater than a fourth predetermined angle. The fourth predetermined angle would be less than the third predetermined angle. The third predetermined angle is an indicator that the vehicle is at a substantial lean angle. The fourth predetermined angle is less than the third predetermined angle and it is determined whether the lean angle is greater than the fourth predetermined angle in step 1550. If the lean angle is greater than the fourth predetermined angle, step 1552 illuminates the selected secondary elements and turns off other selected secondary elements on the other side of the vehicle depending on the lean angle. Step 1560 is performed if the lean angle is not greater than a fourth predetermined angle. In step 1560, it is determined whether the lean angle is greater than a fifth predetermined angle. The fifth predetermined angle is less than the fourth predetermined angle. This indicates that even a lower amount of angle but greater than the second predetermined angle of step 1530 which indicates the vehicle is nearly upright. If the lean angle is greater than the fifth predetermined angle, step 1562 illuminates selected secondary elements and extinguishes or turns off other secondary elements based upon the lean angle as described above. In steps 1552 and 1562, the primary elements on either side of the middle may be extinguished. That is, the amount of secondary elements that are illuminated is based upon the lean angle. For high lean angles, all four elements as illustrated in FIGS. 7A and 7B may be illuminated on the low side of the vehicle. The amount of comparison to different angular thresholds depends upon the number of elements. As the vehicle turns from side to side, the lean angle is used to illuminate or extinguish or turn off various elements. The lights may be gradually turned off to provide more pleasing effect.

When step 1560 is negative and after steps 1532, 1542, 1552 and 1562, step 1564 is performed. In step 1564, a switch setting to determine whether the high beams or low beams are desired is monitored. The control set forth herein corresponds to FIG. 8E. If the high beams are illuminated, step 1566 is used to determine whether the lean angle is greater than a first predetermined angle. If the angle is not above the predetermined angle, the primary high beam element is operated in step 1568. Referring back to step 1566, if the lean angle is greater than a predetermined angle, the primary element of the high beam is operated plus one of the secondary elements.

Referring back to step 1564, if the switch indicates that low beams are to be operated or the high beams are operated, step 1570 is performed. That is, in one example, the low beams are operated according to the following for both high beams and low beams. After steps 1568 and 1570, the method ends and may be restarted as the lean angle changes.

Figure 16:
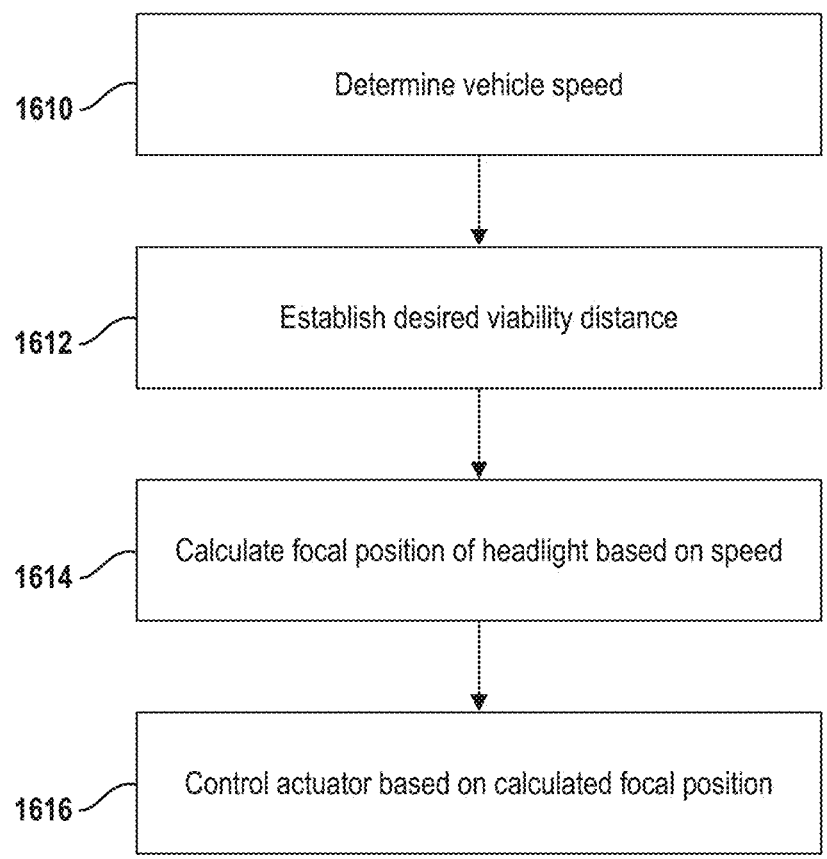
FIG. 16 is a flowchart of a method for adjusting the focal position of a headlight of a vehicle.

Referring now to FIG. 16, a method for adjusting the focal point of the light is set forth. In step 1610, the vehicle speed is determined. In step 1612, a desired visibility distance is established. The desired visibility distance corresponds to an amount of time corresponding to the amount of illumination provided by the headlights. In step 1614, the focal position of the headlight is determined based upon the speed. At low speeds, the spread of the light may be greater but the distance does not need to be as great as at high speeds where the light beam is narrower and illuminate a further distance in front of the vehicle. In step 1616, an actuator is controlled based upon the calculated focal position of the headlight. As the vehicle speed changes, the method set forth in FIG. 16 is repeated and the focal length and width of the headlight is changed.

Figure 17:
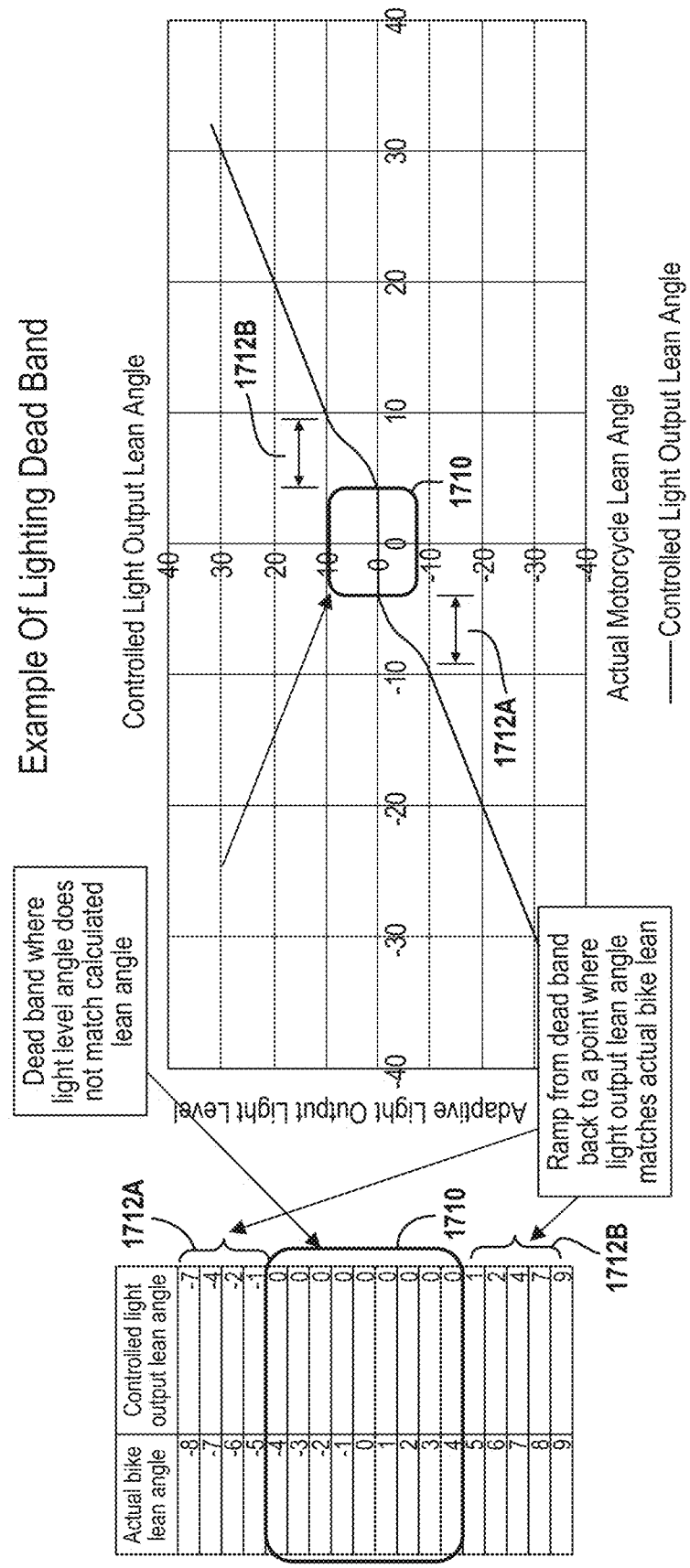
FIG. 17 is plot of adaptive light output versus lean angle showing an example of a lighting deadband.

Referring now to FIG. 17, a plot of the controlled light output lean angle versus the adaptive light output level is set forth. A deadband 1710 is provided where the light level does not match the calculated lean angle. Within the deadband 1710 the controlled light output lean angle is set to zero due to the mismatch. In the shoulder areas 1712A and 1712B, a the controlled light output lean angle ramps the values from zero at the deadband back to a value where the light output lean angle matches the actual lean angle.

Figure 18A:
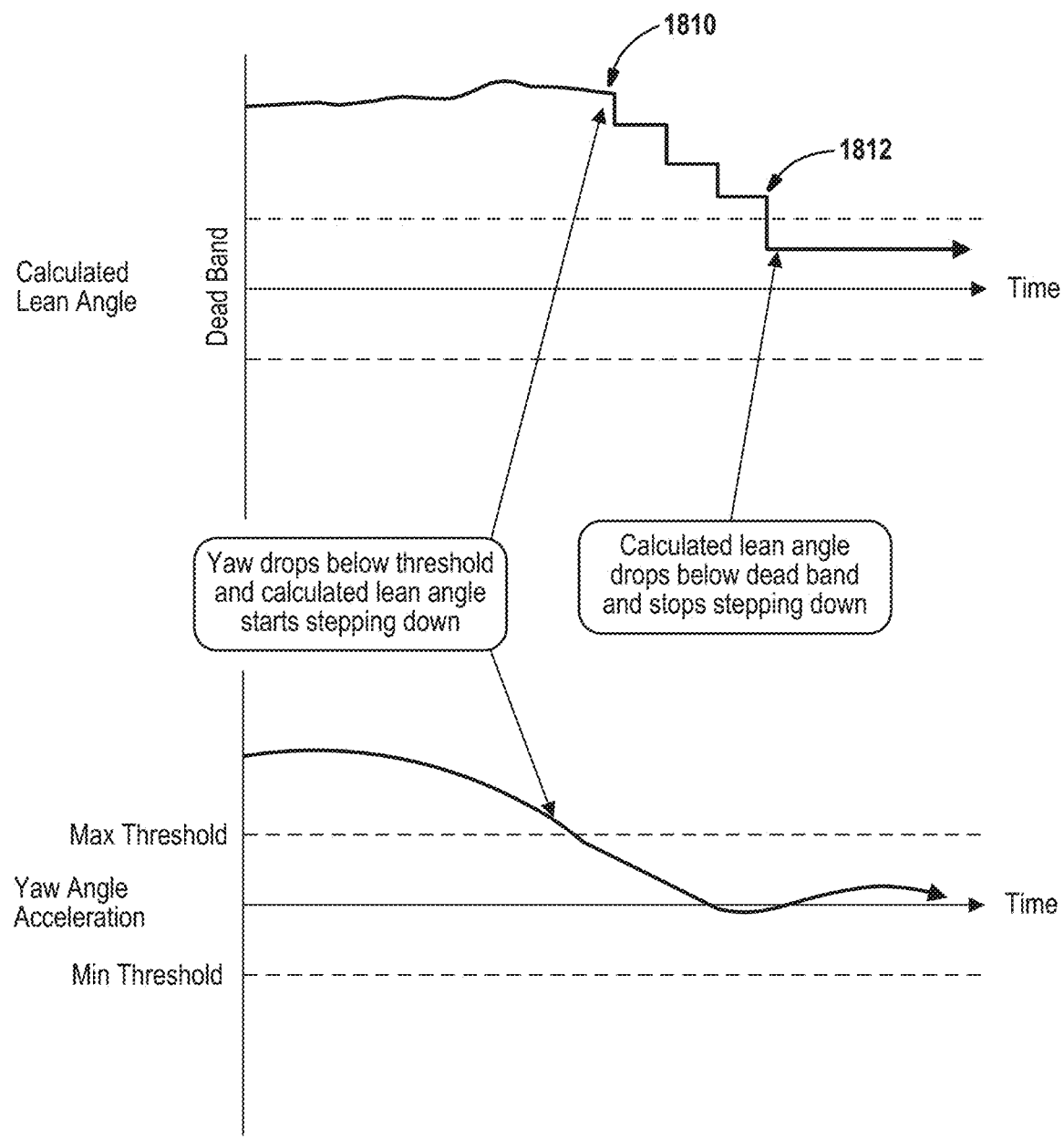
FIG. 18A is plot of calculated lean angle and yaw angle acceleration with an example of yaw angle acceleration dropping into a threshold zone causing calculated light lean angle to start stepping down until it is within the deadband.

Referring now to FIG. 18A the deadband 1710 is shown relative to a calculated lean angle. A maximum and minimum threshold relative to a yaw angle acceleration is also illustrated. The yaw angle acceleration drops into a threshold zone and causes the calculated light lean angle to start stepping down until it is within the deadband. As illustrated, as the yaw drops below the threshold, the calculated lean angle starts stepping down at 1810. When the calculated lean angle drops below the deadband, the stepping down stops at 1812.

Figure 18B:
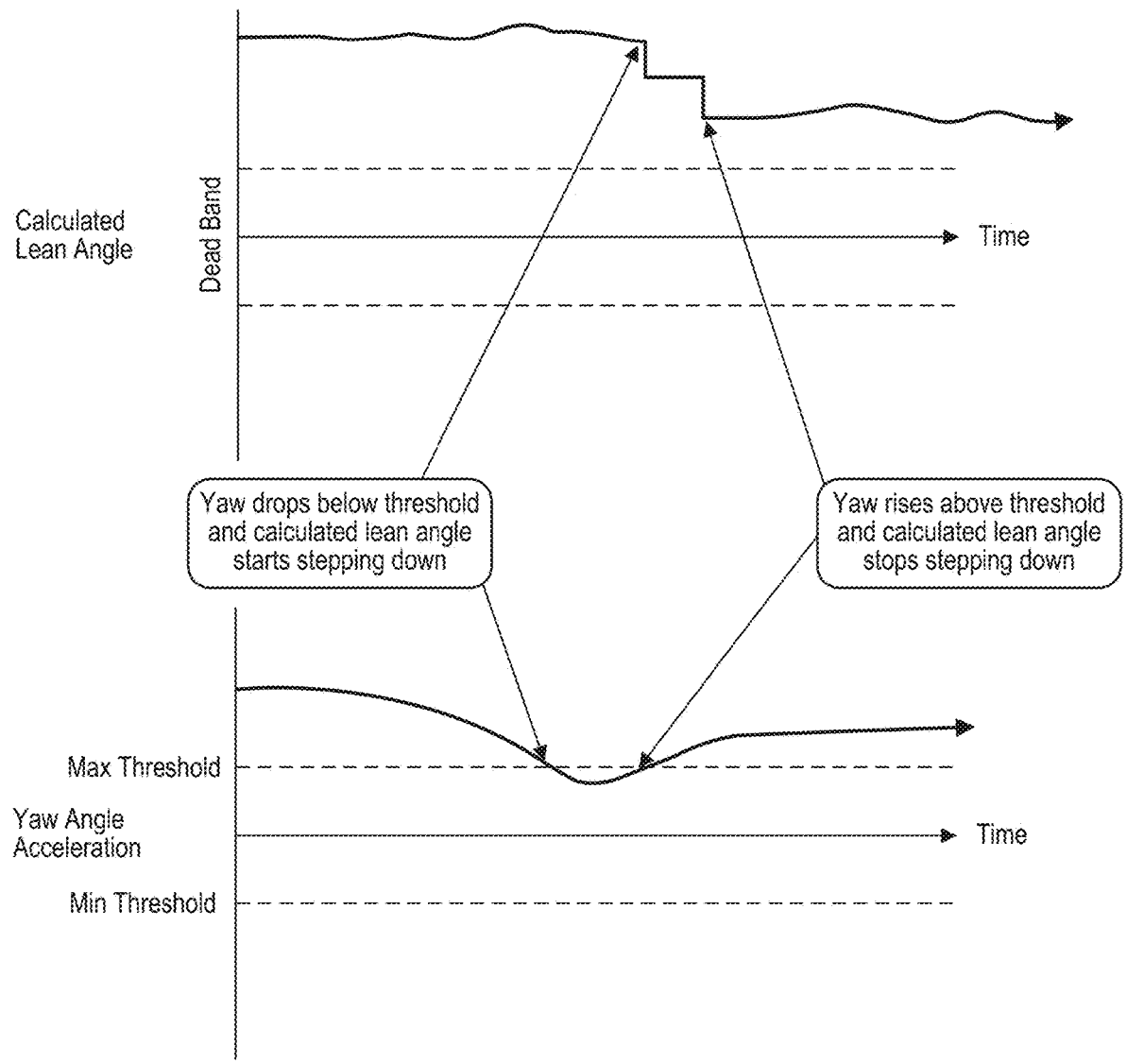
FIG. 18B is a plot of calculated lean angle and yaw angle acceleration with an example showing the yaw angle acceleration dropping into the threshold dead zone and causing calculated light lean angle to start stepping down with a stopping of the stepping down when the acceleration exceeds the maximum threshold.

Referring now to FIG. 18B, the improved system illustrates the yaw angle acceleration dropping below a threshold and the calculated lean angle starts to step down. However, when the yaw angle acceleration rises above the threshold, the calculated lean angle stops stepping down. That is, when the yaw angle acceleration drops into the threshold zone and causes the calculated light lean angle to start stepping down. The stepping down stops as soon as the yaw angle acceleration comes back above the maximum threshold.

That is, while the vehicle is traveling straight there should be no yaw angle acceleration. While cornering there will be a measurable yaw angle acceleration that increases proportionally with the factors such as speed, corner radius and the bank angle. A minimum and maximum yaw angle acceleration may be defined such that when the yaw angle acceleration is between the minimum and the maximum yaw angle acceleration it can be assumed that the vehicle is not cornering. In the present example, plus or minus two degrees per second$^2$ is used as the yaw angle acceleration threshold. However, other values may be used. Thus, the threshold may be defined as a maximum absolute value relative to two degrees per square second. The yaw angle acceleration threshold may be used as an indicator of a very low lean angle to compensate for roll angle inaccuracy at low lean angles. When the yaw angle acceleration is between the maximum and the minimum yaw angle acceleration thresholds, the vehicle is most likely not cornering regardless of the roll acceleration calculation. Thus, the roll acceleration calculation may be corrected based upon the bank angle. When the yaw angle acceleration is within a threshold the calculated bank angle can be incrementally decreased until it is within the lighting deadband.

Figure 19:
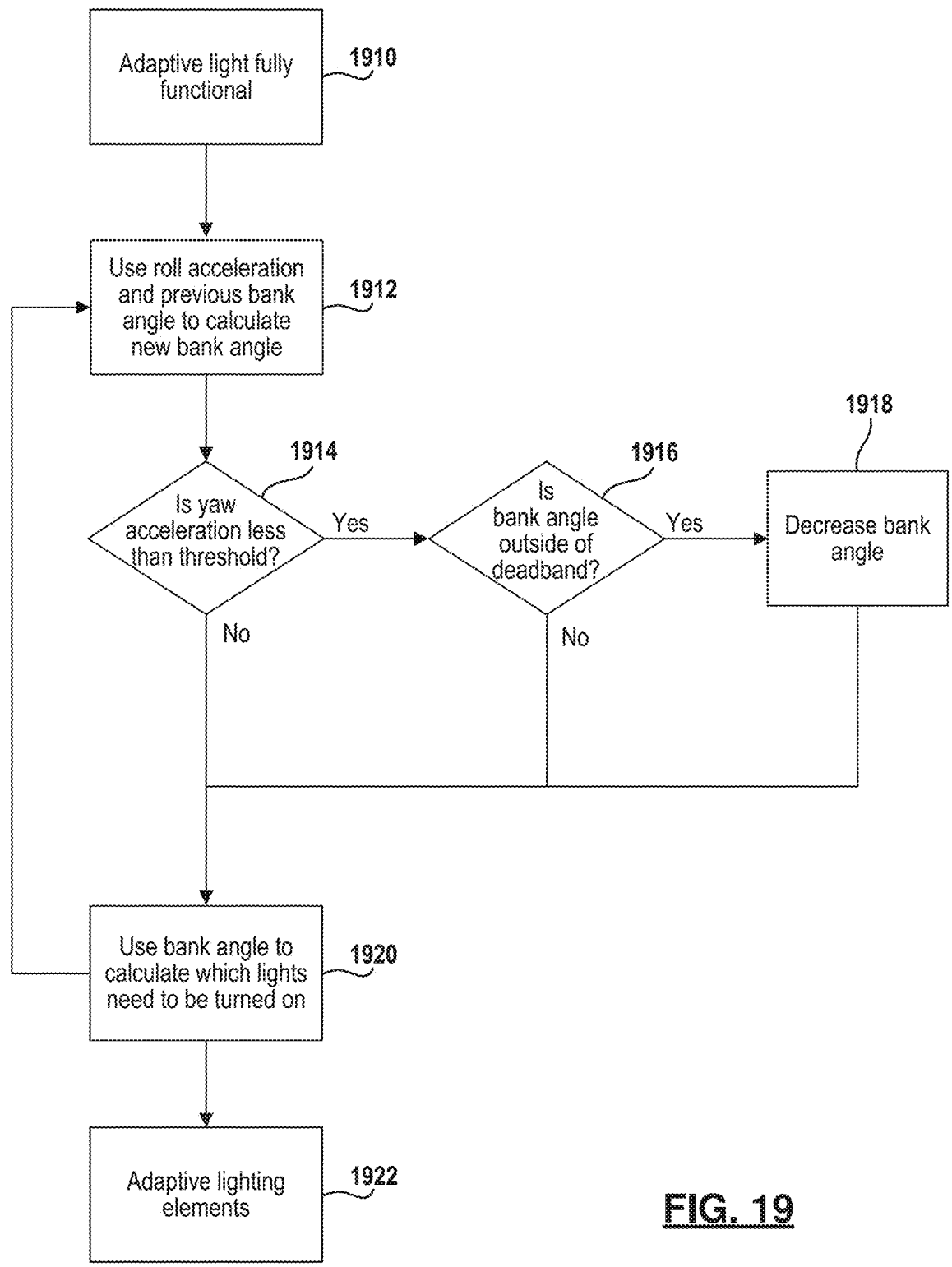
FIG. 19 is a flowchart of a method for correcting the lean angle based upon the bank angle for the vehicle.

Referring now to FIG. 19, a flowchart of a method for correcting the light lean angle is set forth. In step 1910 the inertial measurement unit measures the various accelerations including the yaw angle acceleration and the roll acceleration. In step 1912, the roll acceleration and a previous bank angle are used to calculate a new bank angle. In step 1914 it is determined whether the yaw angle acceleration is less than a threshold. When the yaw angle acceleration is less than a threshold in step 1914, the bank angle is determined and compared to a deadband. When the bank angle is outside of the deadband in step 1916, the bank angle is decreased in step 1918. When the yaw angle acceleration is not less than the threshold, the bank angle is not outside the deadband and after step 1918, step 1920 uses the bank angle to calculate the light elements to illuminate in step 1922.

Figure 20A:
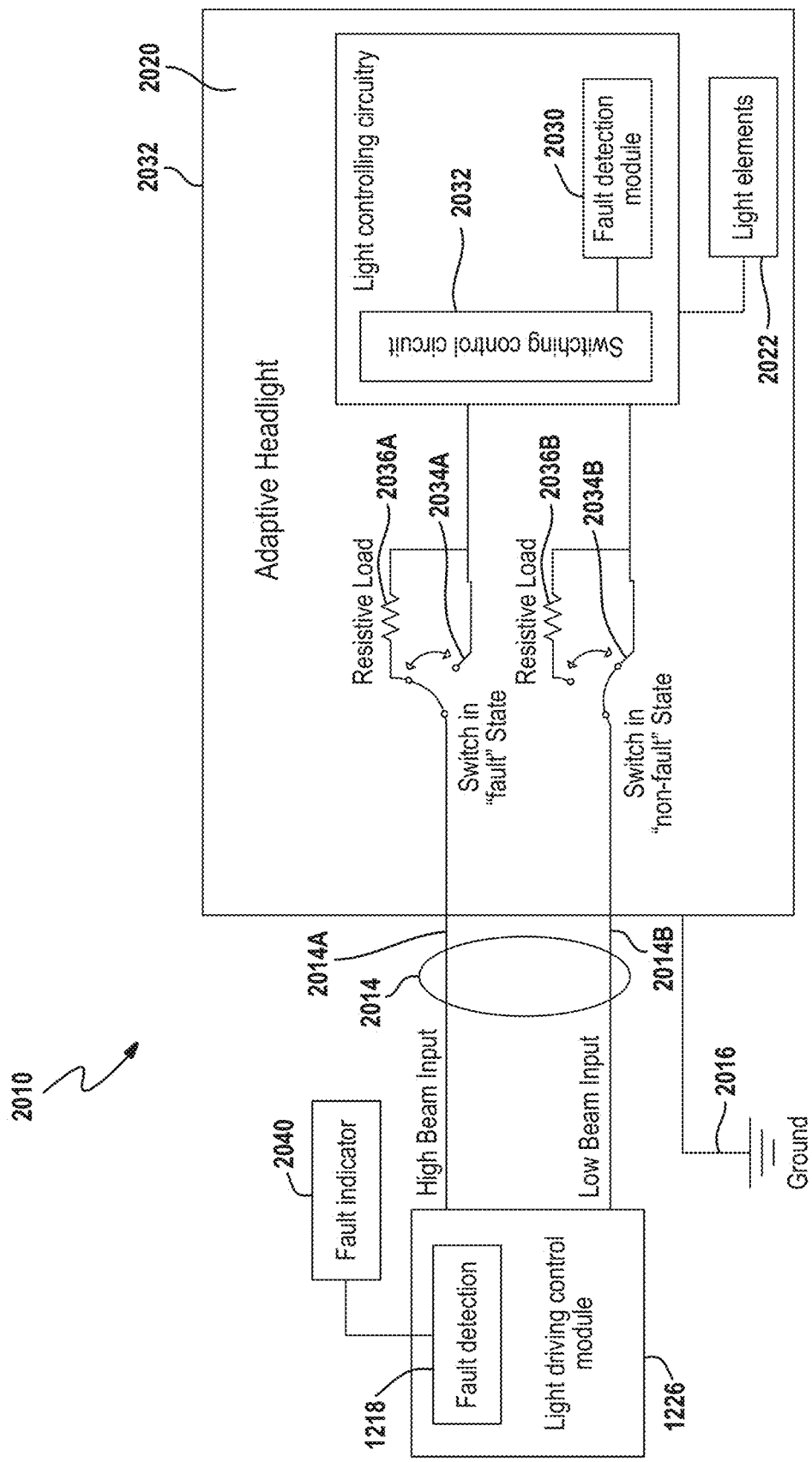
FIG. 20A is a schematic view of a first example of a fault detection system according to the present disclosure.

Referring now to FIG. 20A, a fault detection circuit 2010 using components from the adaptive headlight that has an adaptive headlight housing 2012 and components from the vehicle such as the light driving control module 1218 and the fault detection module 1226. The light driving control module 1218 is coupled to the adaptive headlight housing 2012 using a connection 2014. In this example, a high beam input 2014A and a low beam input 2014B are set forth. The adaptive headlight housing 2012 may be coupled to a common or ground such as vehicle ground 2016. The adaptive headlight housing 2012 includes light controlling circuitry 2020 that is used to drive the light elements 2022. Many governmental entities require a vehicle manufacturer to provide an indication when a headlight is faulty. Traditional headlights are very simple and fault detection module within a vehicle includes the capability to detect an open circuit such as when the filament of the bulb is broken. Another failure mode in a typical system is when an excessively high amount of current is drawn through the light assembly. In this case, the fault detection system 1226 of the vehicle would not adequately notify the vehicle operator of a fault in one or more of the light elements 2022 particularly when only a few light elements 2022 (or segments thereof) are faulty. Errors in the circuitry or software would not be detectable using traditional systems.

In the following examples, the light controlling circuit 2020 may include a fault detection module 2030 and switching control circuit 2032. The switching control circuit 2032 is used to control switches 2034A and 2034B within the housing 2012. In a normal setting, the switches 2034A and 2034B are used to communicate with the connection 2014A and 2014B, respectively. That is, in normal operation the connectors 2014A and 2014B are coupled to the light controlling circuitry 2020 through the switches 2034A and 2034B, respectively. When a fault is detected in one of the high beam elements, the fault detection module 2032 generates a high beam fault signal that is communicated to the switching control circuit 2032. The switching control circuit 2032 changes the position of the switch 2034A to place a different circuit component between the connector 2014A and the light control circuitry 2020. In this example, a resistive load 2036A is placed within the circuit. The resistive load 2036A has a different electrical characteristic then the normal connection between the electrical connection 2014A and the switching control circuit 2032. By providing a change in the electrical characteristics, the fault detection module 1226 of the vehicle may control a fault indicator 2040 to indicate to the vehicle operator that a fault is present within the high beam elements. The fault indicator 2040 may, for example, be an amber indicator light that is illuminated either constantly or flashing, a multi-segment LED generating a code error, a touchscreen display generating an error or circuitry that is used to drive the high beam element to rapidly flash or provide some other change in the characteristic to indicate to the vehicle operator that the high beam is not functioning properly.

The low beam circuitry may also operate in the same manner. The low beam includes a resistive load 2036B that is switched into the circuitry when an error or fault is detected by the fault detection module 2030. In the same manner, the fault detection module 1226 controls the fault indicator 2040 to inform the vehicle operator that a fault is present in the low beam light elements.

The fault indicator 2040 may be illuminated when the fault detection module 2030 within the adaptive headlight housing 2012 determines a fault. Faults may include, but are not limited to, one or more of the low beam or high beam elements having an open circuit. In an adaptive headlight, various other errors may be detected such as a software error, circuitry malfunction, individual light emitting diodes segment failures, a sensor error (e.g., IMU) and the like.

Figure 20B:
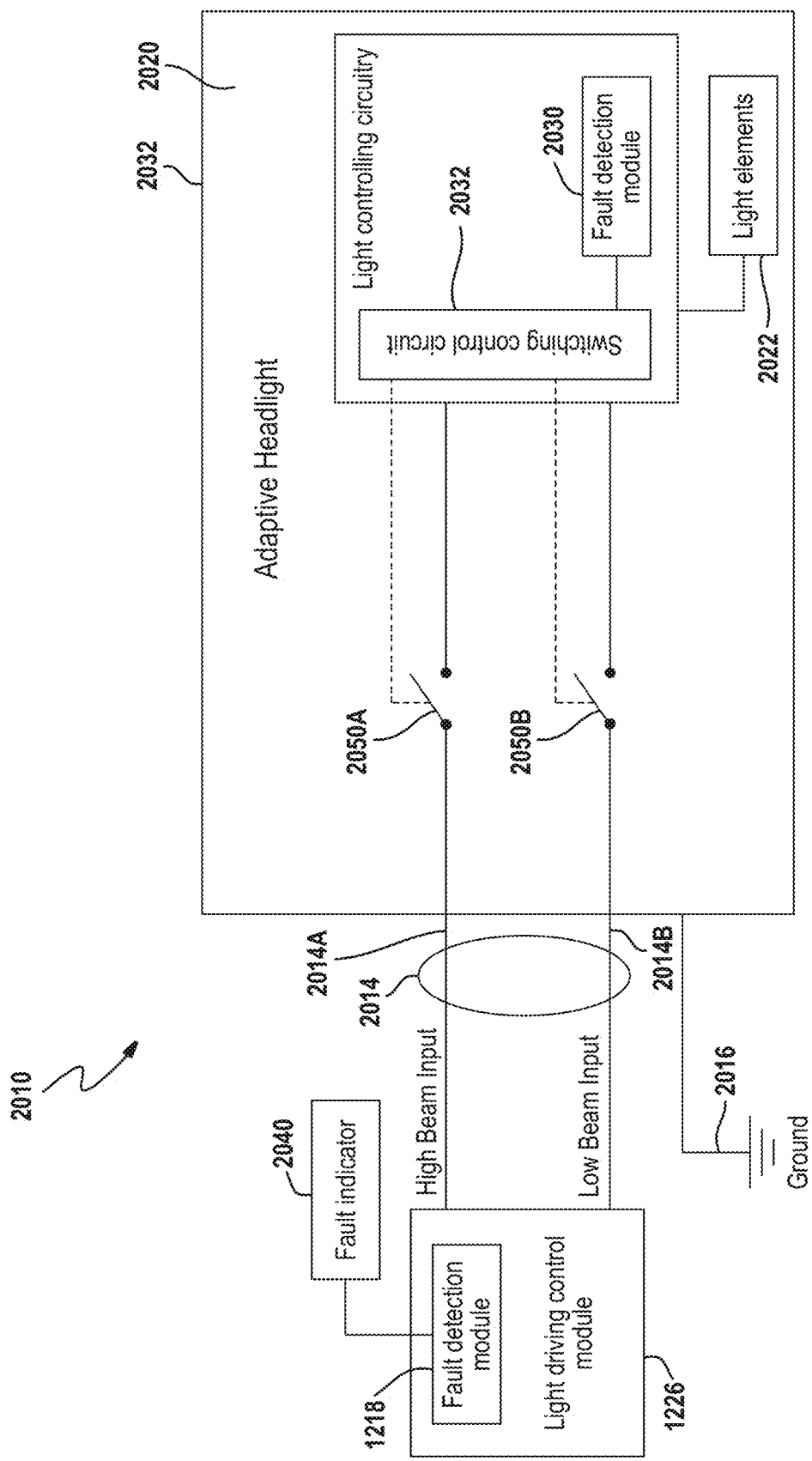
FIG. 20B is a schematic view of a first example of a fault detection system according to the present disclosure.

Referring now to FIG. 20B, another way to indicate to the fault detection module 2026 that an error has occurred is by providing an open circuit between the connections 2014A and 2014B and the light control circuitry 2020. In this example, a switch 2050A is disposed within the high beam circuit and a switch 2050B is disposed within the low beam circuit within the housing 2012. When the fault detection module 2030 determines a fault within the high beam light elements or the low beam light elements, the appropriate switch 2050A or 2050B are activated into an open position. By providing an open circuit, the fault detection module 1226 provides an indicator appropriate for a fault within either the high beam or low beam elements. The remainder of the circuit of FIG. 20A is the same and is appropriately labeled in FIG. 20B.

Figure 20C:
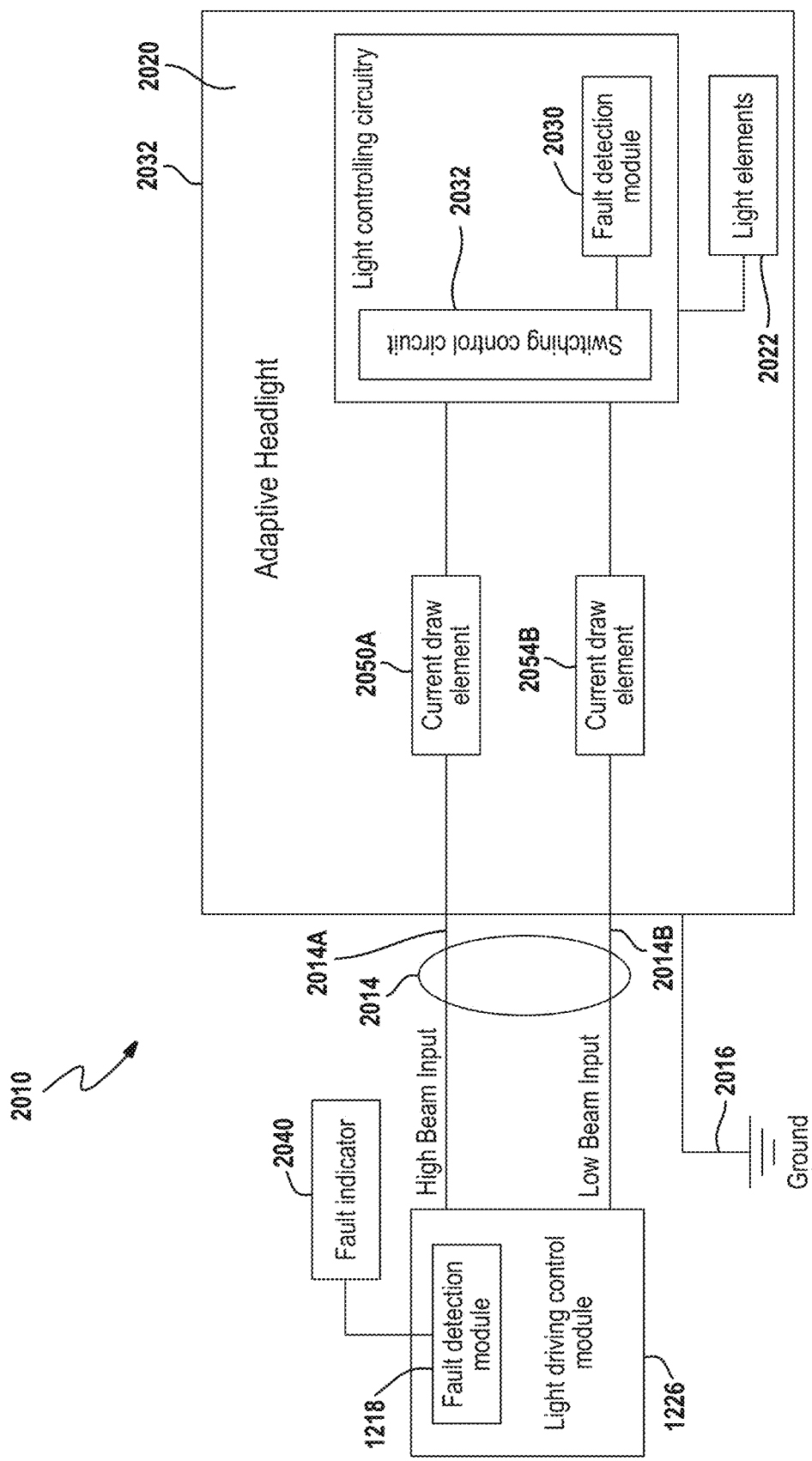
FIG. 20C is a schematic view of a first example of a fault detection system according to the present disclosure.

Referring now to FIG. 20C, the circuit illustrated in FIG. 20A has been modified to include a current draw element 2054A and 2054B that are disposed within the high beam circuit and the low beam circuit, respectively. In this example, a current draw element is switched by the switching control circuitry 2020 when a fault is indicated. The current draw element 2054A and 2054B may be sized to allow a fault to be indicated to the fault detection module 2026 without the fault detection module 2026 shutting down the entire light control circuitry 2020. The current draw elements 2054A and 2054B are used to change the electrical characteristics of the circuit within the lighting assembly.

Figure 21A:
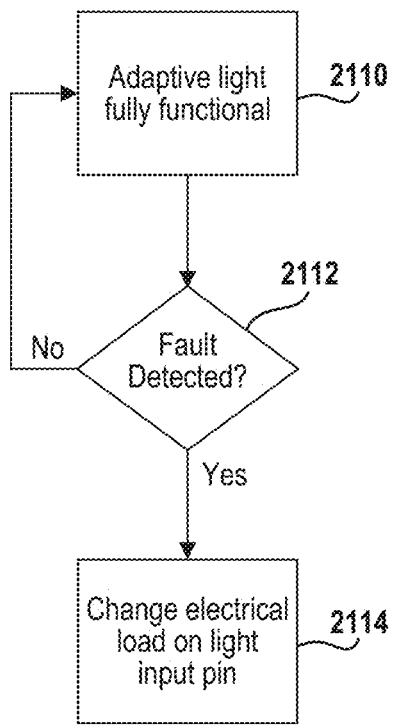
FIG. 21A is a simplified flowchart of a method for operating a fault detection system according to the present disclosure.

Referring now to FIG. 21A, step 2110 illustrates the adaptive headlight functioning in a fully functional manner. In step 2112 a fault is detected. When no fault is detected step 2110 is again performed. When a fault is detected in step 2112, step 2114 changes an electrical load on the light input pin/connector to the light driving control module. That is, the electrical characteristic of either the high beam or low beam or general light control connection is changed.

Figure 21B:
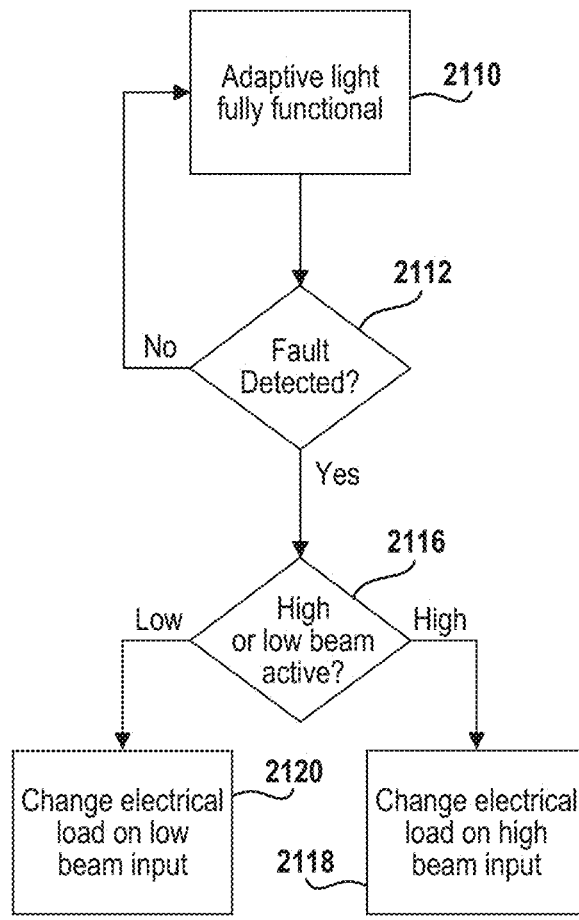
FIG. 21B is a flowchart of a method for operating a fault detection system with separate control for both the high beam and low beam.

Referring now to FIG. 21B, the first two steps 2110 and 2112 are identical as set forth above. However, in this manner step 2116 determines whether the high beam or low beam elements are active. When the high beam elements are active, step 2118 determines whether a change in the electrical load or other electrical characteristics is present within the high beam input. That is, when the electrical characteristic of the connection 2014A is provided, step 2118 allows a fault to be indicated by the fault indicator 2040.

In step 2116, when the load beam is active and an electrical load or electrical characteristic of the load beam circuitry is indicated at the connection 2014B, a fault may be indicated at the fault indicator 2040.

Figure 21C:
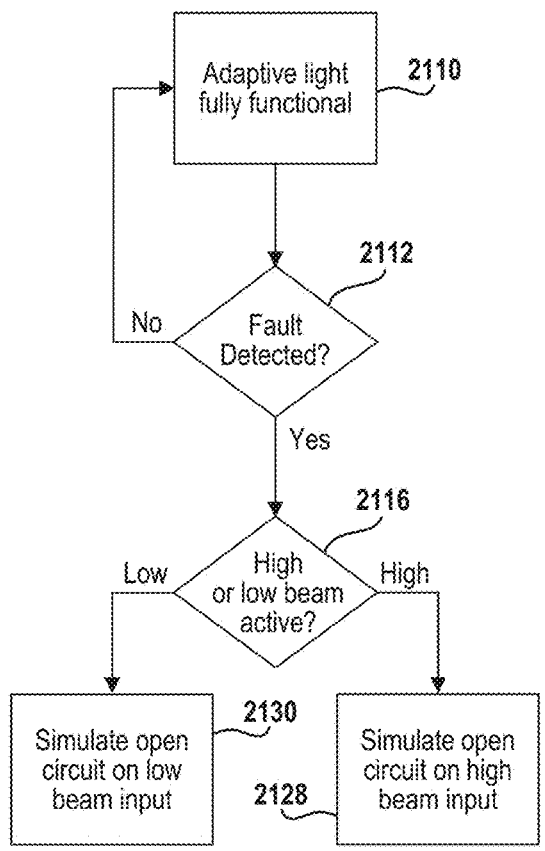
FIG. 21C is a flowchart of a method for simulating an open circuit to simulate fault in an adaptive light.

Referring now to FIG. 21C, the same elements 2110, 2112, and 2116 are provided in this example and will not be repeated. In step 2128, when the high beam is determined to have a fault, an open circuit is generated by the circuit illustrated in FIG. 20B. When a low beam element indicates a fault when the low beam is active in step 2116, step 2130 generates an open circuit and a fault may be indicated by the fault indicator 2040.

Figure 21D:
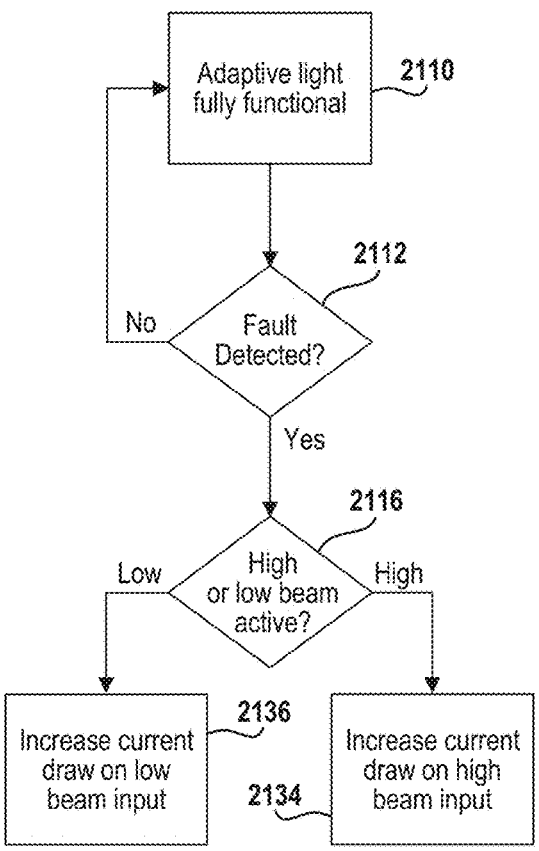
FIG. 21D is a flowchart of a method for operating a fault detection system having an increase in current for a low beam.

Referring now to FIG. 21D, the flowchart of FIG. 20C is repeated in that steps 2110, 2112 and 2116 are identical. However, in this manner step 2134 is performed when the high beams are active in step 2116 and a fault is detected by the fault detection module 2030. The current draw may be increased by switching a current draw element 2054A or 2054B into the circuitry such as in FIG. 20C. When a low beam element is active in step 2116 and a fault is detected at the fault detection module 2030 for the low beam element, step 2136 increases the current draw in the low beam input and thus the fault is detected at the fault detection circuit 2026.

Figure 21E:
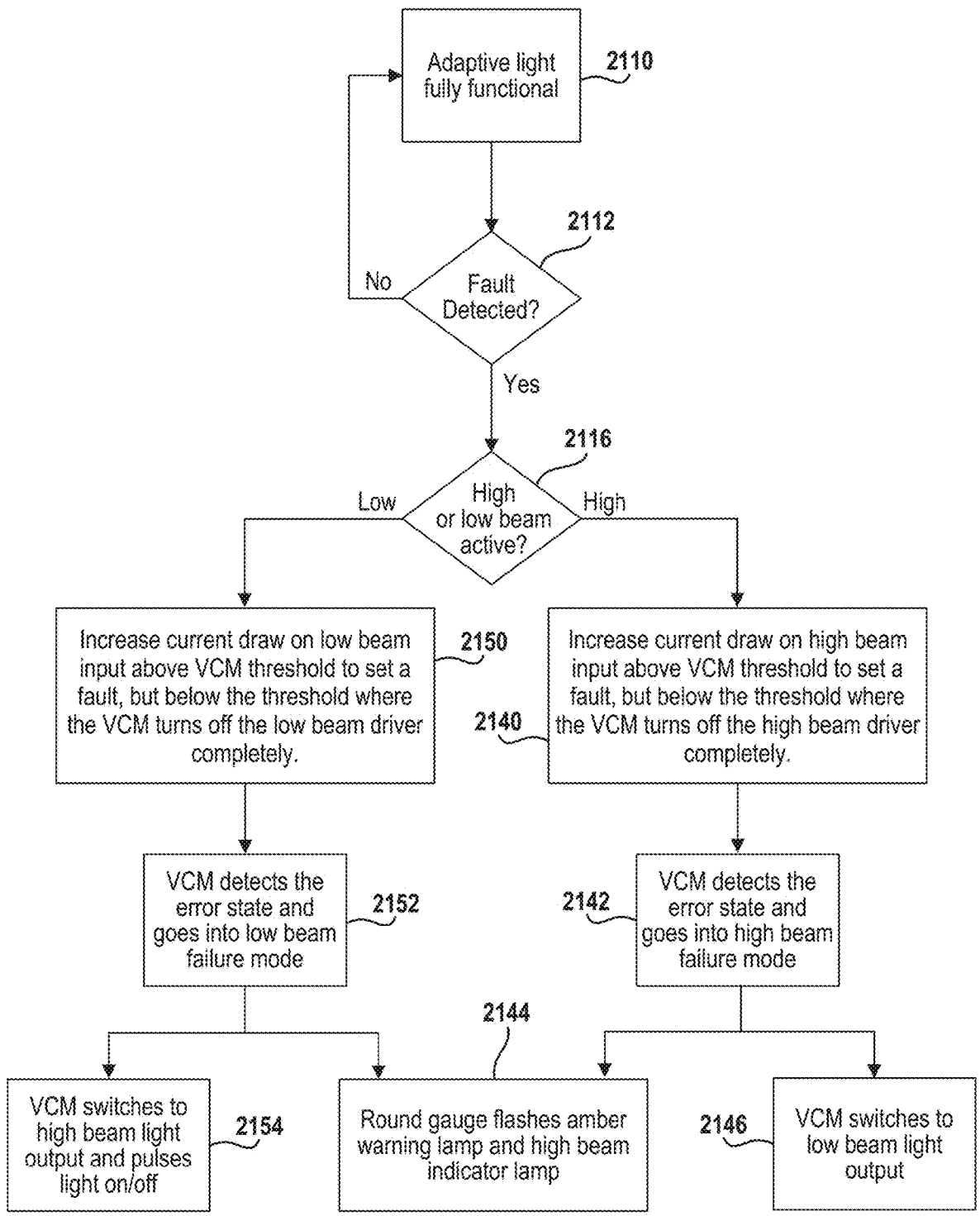
FIG. 21E is a flowchart of a method for operating a fault detection system with threshold sensitive parameters.

Referring now to FIG. 21E, a method having the first three elements of FIG. 21D is set forth. In this example, the description is not repeated. When a high beam is active in step 2116, step 2140 is performed. In step 2140 the current draw is increased on the high beam connector 2014A above a vehicle control module's threshold to set a fault but below a threshold that the voltage control module turns off the high beam driver within the light driving control module 1218. As was illustrated above, an electronically actuated switch that adds a resistive load within the headlight housing 2012 may be performed. For example, a resistive load 2036A may be provided. Of course, other electrical characteristics may also be changed and sensed.

After step 2140, step 2142 detects an error state using the light driving control module. The light driving control module, may be part of the vehicle control module. A high beam failure is thus indicated by flashing gages such as a round gage to indicate the high beams are not functioning properly. In addition to or instead of step 2144, step 2146 allows the vehicle control module to switch to the low beam light output and thus a high beam may not be provided when a fault is indicated at the high beam elements.

Referring back to step 2116, when the low beam is active step 2150 increases the current draw on the low beam input above a vehicle control module threshold to set a fault. The current draw is below that which would shut down or turn off the low beam driver within the light driving control module 1218. This is performed in the same manner as that set forth in step 2140, but with the low beams. After step 2150, step 2152 detects the error state at the fault detection module and enters a low beam fault or failure mode. After step 2152, step 2144 may be performed to generate an indicator that the low beams are faulty.

Referring back to step 2152, the vehicle control module may also be switched to a high beam input in step 2154. That is, the high beams may be used as a failsafe for the low beams. However, the light may be pulsed to provide a reduced amount of light output. That is, pulse with modulation may be used to reduce the amount of light output from the high beams so that a failsafe mode may be provided.

In the manner provided in FIGS. 20 and 21, failure detection of low beam elements and high beam elements of an adaptive headlight are provided without having to provide additional equipment in a vehicle. That is, the existing vehicle fault detection circuitry may be used and the adaptive headlight is used to provide the fault indication. This allows an adaptive headlight to be provided in an after market situation because no modification of the vehicle circuitry is required to be provided. But, fault detection is provided.

Also, the resistive load is placed in parallel to the switch in FIG. 21A. The resistive load may also be placed in series. What is important is that the electrical characteristic of the high beam or low beam circuitry is changed and that the fault detection circuit within the vehicle can detect the change.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A lighting system for a vehicle having a vehicle structure, said lighting system comprising:
 a plurality of primary low beam elements comprising a first primary low beam element, a second primary low beam element and a third primary low beam element, the second primary low beam element is disposed between the first primary low beam element and the third primary low beam element;
 a plurality of secondary low beam elements;
 a lean angle sensor coupled to the vehicle structure generating a lean angle signal;
 a controller coupled to the lean angle sensor controlling the plurality of primary low beam elements and the plurality of secondary low beam elements in response to the lean angle signal, said controller controlling the second primary low beam element to be always illuminated during low beam operation and the first primary low beam element and the third primary low beam element are controlled to be selectively illustrated based on the lean angle signal, and said controller controlling the first primary low beam element, the second primary low beam element and the third primary low beam element to all be illuminated when the lean angle signal corresponds to an angle less than a predetermined angle; and
 the second primary low beam element is always illuminated during low beam operation and the first primary low beam element and the third primary low beam element are selectively illuminated based on the lean angle signal.

2. A lighting system for a vehicle having a vehicle structure, said lighting system comprising:
a plurality of primary low beam elements;
a plurality of secondary low beam elements;
a primary high beam element and a secondary high beam element;
a lean angle sensor coupled to the vehicle structure generating a lean angle signal; and
a controller coupled to the lean angle sensor controlling the plurality of primary low beam elements, the plurality of secondary low beam elements and the secondary high beam element in response to the lean angle signal.

3. The lighting system of claim 2 wherein the secondary high beam element comprises a first secondary high beam element and a second secondary high beam element.

4. The lighting system of claim 3 wherein the first secondary high beam element and the second secondary high beam element are selectively activated based on the lean angle signal.

5. The lighting system of claim 1 further comprising a plurality of driving lights, wherein the controller controls the driving lights in response to the lean angle signal.

6. The lighting system of claim 5 wherein when the lean angle signal corresponds to a lean angle greater than a predetermined angle illuminating a first secondary driving light element and not illuminating a second secondary driving light element.

7. A lighting system for a vehicle having a vehicle structure, said lighting system comprising:
a primary high beam element;
a secondary high beam element comprising a first secondary high beam element and a second secondary high beam element, the secondary high beam element comprises a first secondary high beam element and a second secondary high beam element;
a lean angle sensor coupled to the vehicle structure generating a lean angle signal;
a controller coupled to the lean angle sensor controlling the first secondary high beam element and the second secondary high beam element in response to the lean angle signal.

8. The lighting system of claim 7 wherein when the lean angle signal corresponds to a lean angle greater than a predetermined angle illuminating the first secondary high beam element and not illuminating the second secondary high beam element.

9. The lighting system of claim 8 further comprising illuminating the primary high beam element and when the lean angle signal corresponds to a lean angle greater than a predetermined angle illuminating the first secondary high beam element and not illuminating the second secondary high beam element.

10. The lighting system of claim 7 further comprising a plurality of driving lights, wherein the controller controls the driving lights in response to the lean angle signal.

11. A method of operating a light assembly of a vehicle comprising:
determining a lean angle of the vehicle;
selectively controlling primary low beam elements in response to the lean angle, the plurality of low beam elements comprising a first primary low beam element, a second primary low beam element and a third primary low beam element, the second primary low beam element is disposed between the first primary low beam element and the third primary low beam element; and
selectively controlling secondary low beam elements in response to the lean angle, controlling the second primary low beam element to be always illuminated during low beam operation and the first primary low beam element and the third primary low beam element are controlled to be selectively illustrated based on the lean angle signal, and controlling the first primary low beam element, the second primary low beam element and the third primary low beam element to all be illuminated when the lean angle signal corresponds to an angle less than a predetermined angle.

12. A method of operating a light assembly of a vehicle comprising:
determining a lean angle of the vehicle;
determining a bank angle from a roll angle;
when a yaw angle acceleration is less than a yaw angle acceleration threshold and the bank angle is outside a deadband, decreasing the bank angle to a revised bank angle and using the revised bank angle to activate primary low beam elements, secondary low beam elements or secondary high beam elements; and
when the yaw angle acceleration is not less than the yaw angle acceleration threshold or the bank angle not outside the deadband, using an unmodified bank angle to activate primary low beam elements or secondary high beam elements.

13. An adaptive light assembly for a vehicle comprising a light control module control module with a first fault detection module comprising:
light controlling circuitry comprising a second fault detection module, said second fault detection module detecting a fault within the adaptive light assembly; and
a switching circuit coupled to the light controlling circuitry to simulate an error detectable by the first fault detection module.

14. The adaptive light assembly as recited in claim 13 wherein the fault corresponds to one of a light segment error, a circuit error, sensor or a software error within the adaptive light assembly.

15. The adaptive light assembly as recited in claim 13 wherein the switching circuit changes an electrical characteristic within the adaptive light assembly.

16. A method of indicating a fault in a light assembly comprising:
coupling an adaptive light assembly to a vehicle light driving control module, said light assembly comprising light controlling circuitry comprising a first fault detection module;
detecting a fault within the light assembly;
controlling a switch within the light assembly to generate a change in an electrical characteristic of a connection to a vehicle light driving control circuit;
detecting the change in the electrical characteristic at the vehicle light driving control module; and
controlling a fault indicator in response to the change in the electrical characteristic.

* * * * *